United States Patent
Sung et al.

(10) Patent No.: US 9,900,591 B2
(45) Date of Patent: Feb. 20, 2018

(54) DISPLAY APPARATUS

(71) Applicant: LG ELECTRONICS INC., Seoul (KR)

(72) Inventors: Jaehyun Sung, Seoul (KR); Sangdon Park, Seoul (KR); Jongwon Song, Seoul (KR); Inkeun Ryu, Seoul (KR); Kihyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/128,937

(22) PCT Filed: May 28, 2014

(86) PCT No.: PCT/KR2014/004776
§ 371 (c)(1),
(2) Date: Sep. 23, 2016

(87) PCT Pub. No.: WO2015/147375
PCT Pub. Date: Oct. 1, 2015

(65) Prior Publication Data
US 2017/0127057 A1    May 4, 2017

(30) Foreign Application Priority Data

Mar. 25, 2014  (KR) .................... 10-2014-0034663
May 8, 2014   (KR) .................... 10-2014-0055145

(51) Int. Cl.
*H04N 17/00*   (2006.01)
*H04N 17/02*   (2006.01)
(Continued)

(52) U.S. Cl.
CPC ......... *H04N 17/045* (2013.01); *F16M 11/045* (2013.01); *F16M 11/10* (2013.01);
(Continued)

(58) Field of Classification Search
CPC ...... H04N 17/04; H04N 17/045; H04N 5/225; H04N 5/64; H04N 7/015; F16M 13/02; F16M 13/022; H01L 51/5237
(Continued)

(56) References Cited

U.S. PATENT DOCUMENTS 9,024,937 B2 *  5/2015  Hayashi ............... G09G 3/20
                                                345/214
9,305,482 B2 *  4/2016  Park ................. G01J 3/506
9,390,646 B2 *  7/2016  Park ................. G09G 3/2003

FOREIGN PATENT DOCUMENTS

JP     2006-091237      4/2006
KR     10-2006-0104007  10/2006
(Continued)

OTHER PUBLICATIONS

PCT International Application No. PCT/KR2014/004776, International Search Report dated Dec. 17, 2014, 4 pages.

*Primary Examiner* — Trang U Tran
(74) *Attorney, Agent, or Firm* — Lee, Hong, Degerman, Kang & Waimey

(57) ABSTRACT

An display apparatus according to an embodiment of the present invention may includes a display panel on which an image is output; and a calibration device which is mounted on a rear surface of the display panel. The calibration device includes a housing, a drive motor which is disposed on an inside portion or an outside portion of the housing, a link assembly which is accommodated in the inside portion of the housing, which is capable of being withdrawn to the outside of the housing by power provided form the drive motor and which is provided to be capable of being bent or being rotated, and an photographing unit which is mounted on an end of the link assembly and photographs the image displayed on the display panel.

16 Claims, 30 Drawing Sheets

(51) Int. Cl.
*H04N 17/04* (2006.01)
*H04N 5/64* (2006.01)
*G06F 1/16* (2006.01)
*F16M 11/04* (2006.01)
*F16M 11/10* (2006.01)
*F16M 11/18* (2006.01)
*F16M 11/24* (2006.01)
*F16M 13/02* (2006.01)
*H01L 51/52* (2006.01)
*H04N 5/225* (2006.01)
*H04N 7/015* (2006.01)

(52) U.S. Cl.
CPC ............. *F16M 11/18* (2013.01); *F16M 11/24* (2013.01); *F16M 13/022* (2013.01); *G06F 1/1607* (2013.01); *H01L 51/5237* (2013.01); *H04N 5/225* (2013.01); *H04N 5/64* (2013.01); *H04N 7/015* (2013.01); *H04N 17/00* (2013.01)

(58) Field of Classification Search
USPC .................................. 348/794, 836, 843, 177
See application file for complete search history.

(56) References Cited

FOREIGN PATENT DOCUMENTS

| | | | | |
|---|---|---|---|---|
| KR | 10-0775889 | * | 11/2007 | ............. G02F 1/133 |
| KR | 10-2011-0123427 | | 11/2011 | |
| KR | 10-1160118 | | 6/2012 | |
| KR | 10-2014-0002353 | | 1/2014 | |

* cited by examiner

[Fig. 1]
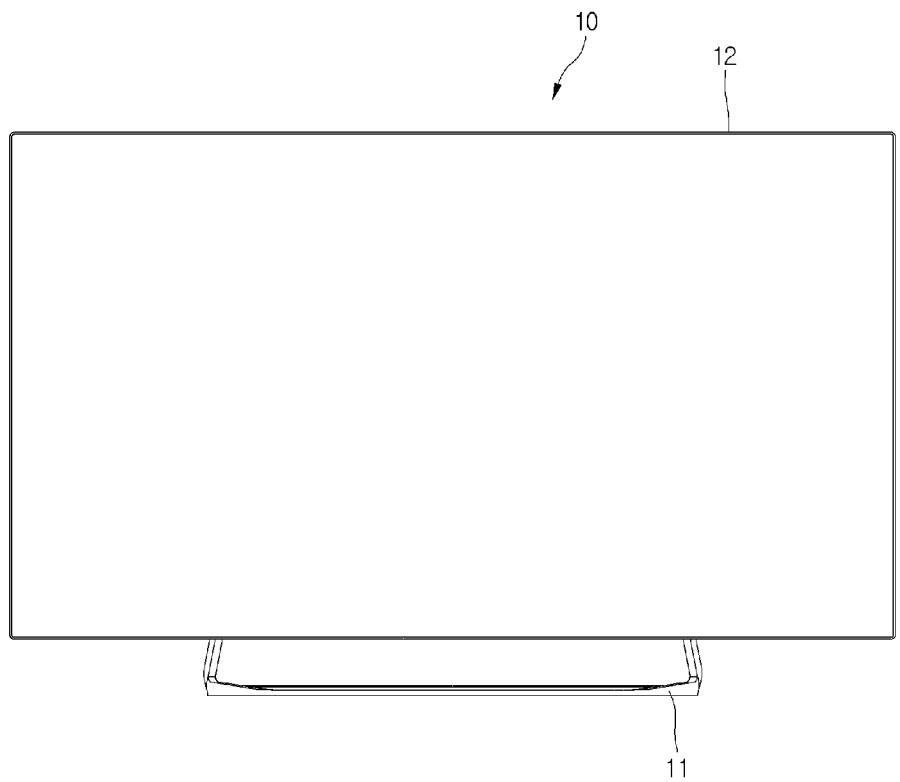
[Fig. 2]
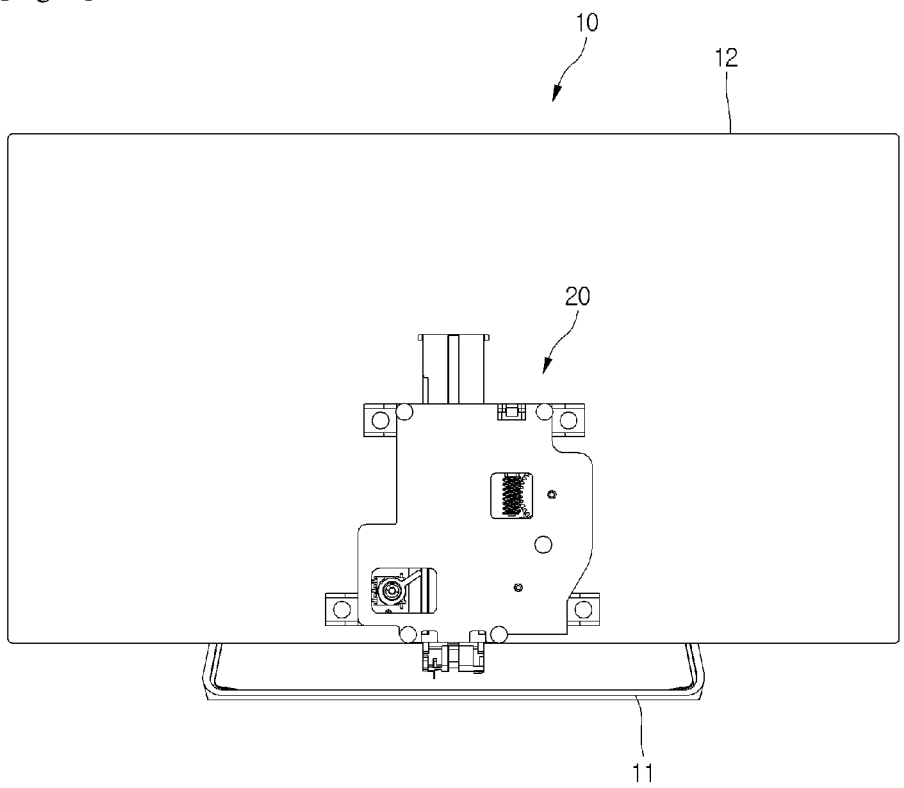

[Fig. 3]
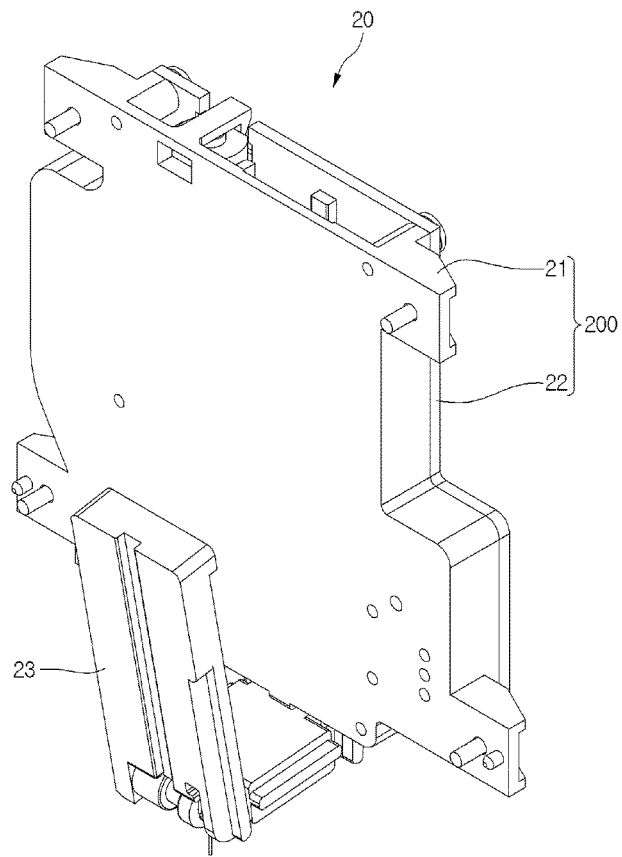
[Fig. 4]
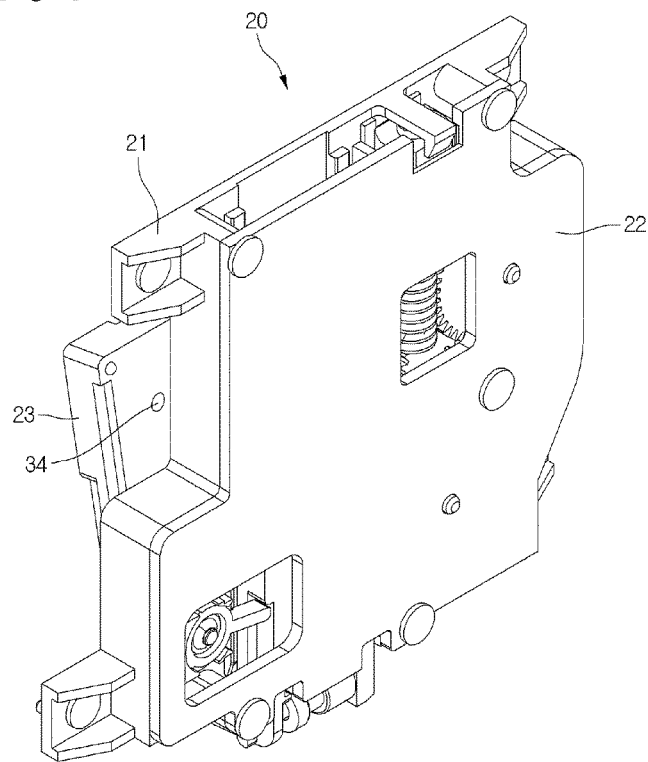

[Fig. 5]
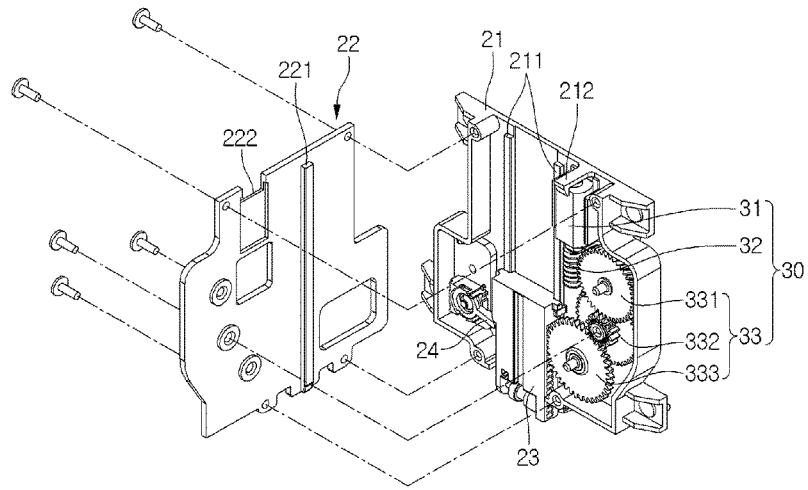
[Fig. 6]
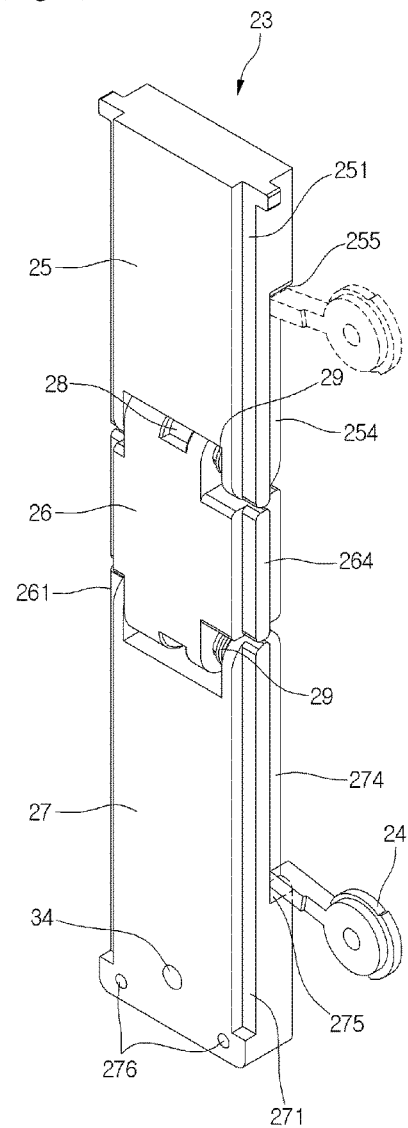

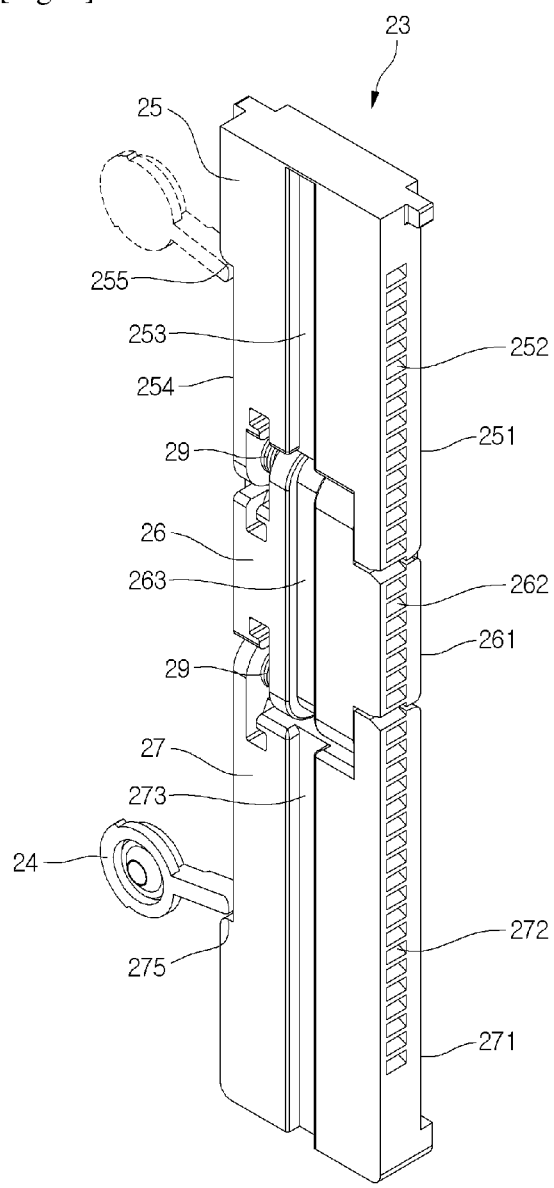
[Fig. 7]

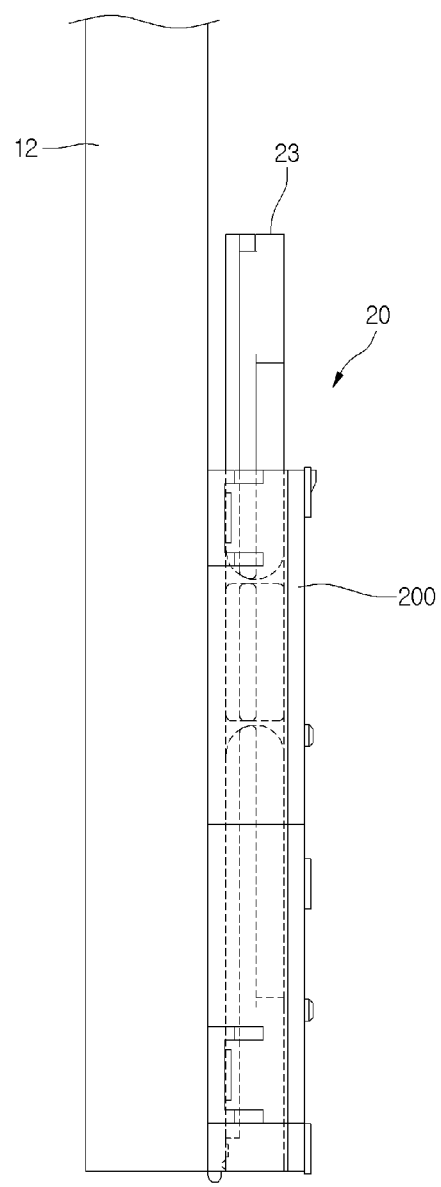
[Fig. 8]

[Fig. 9]
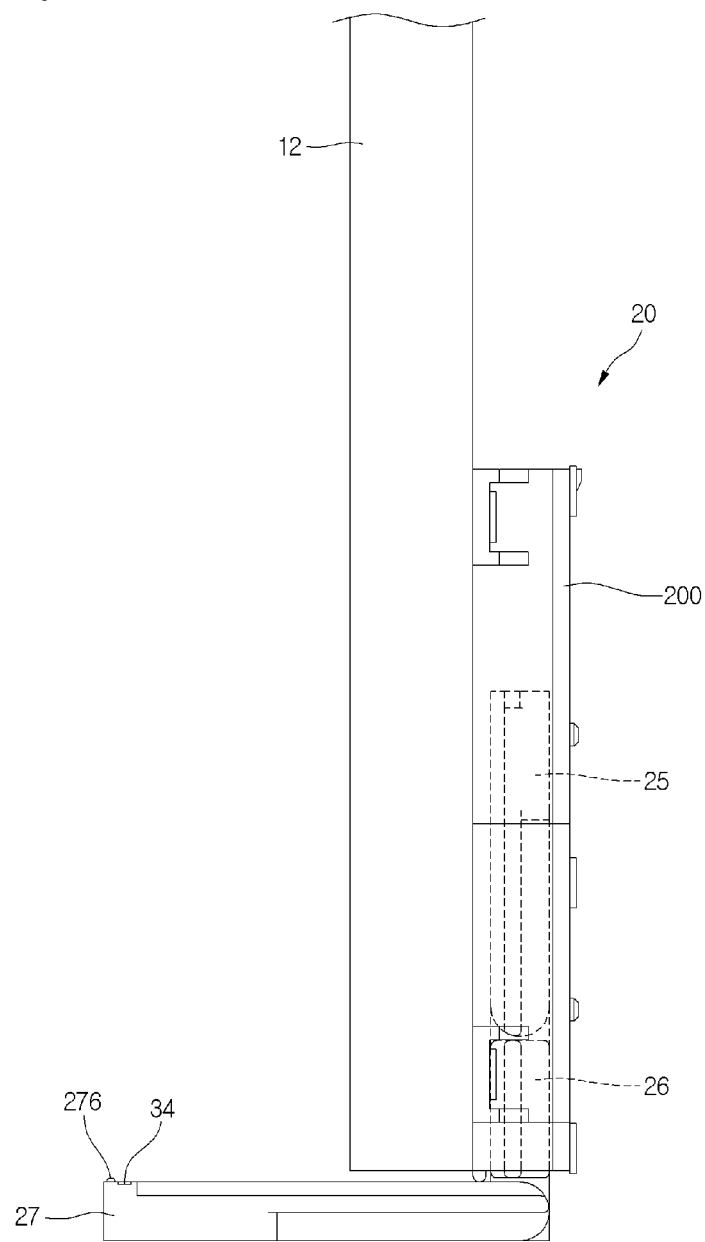

[Fig. 10]
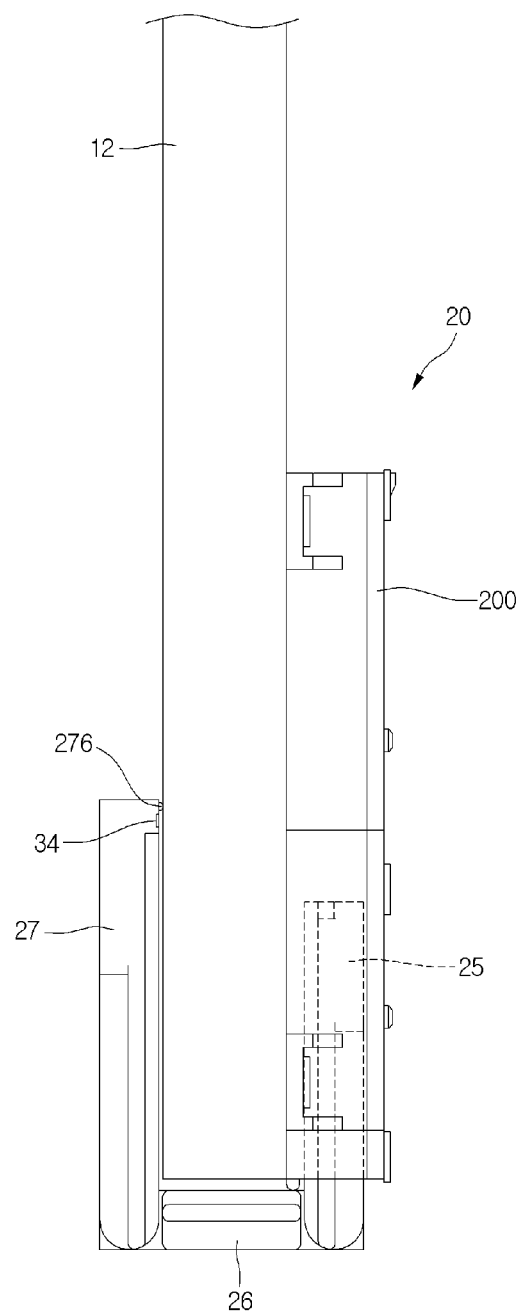

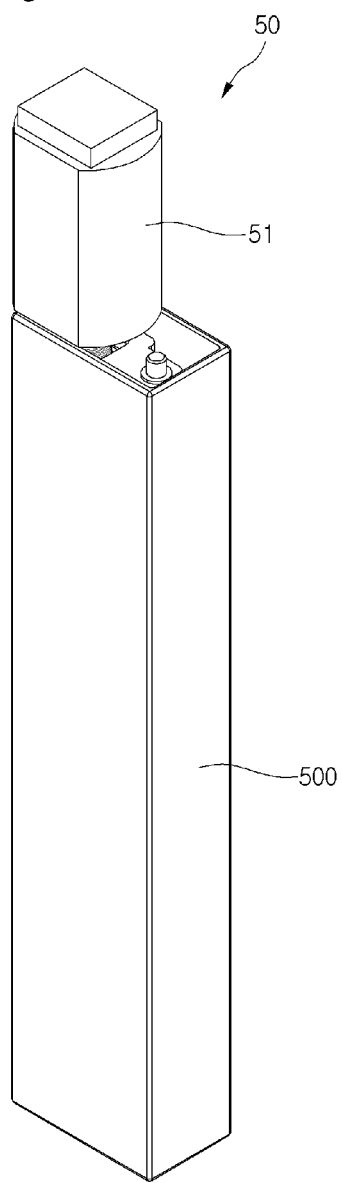
[Fig. 11]

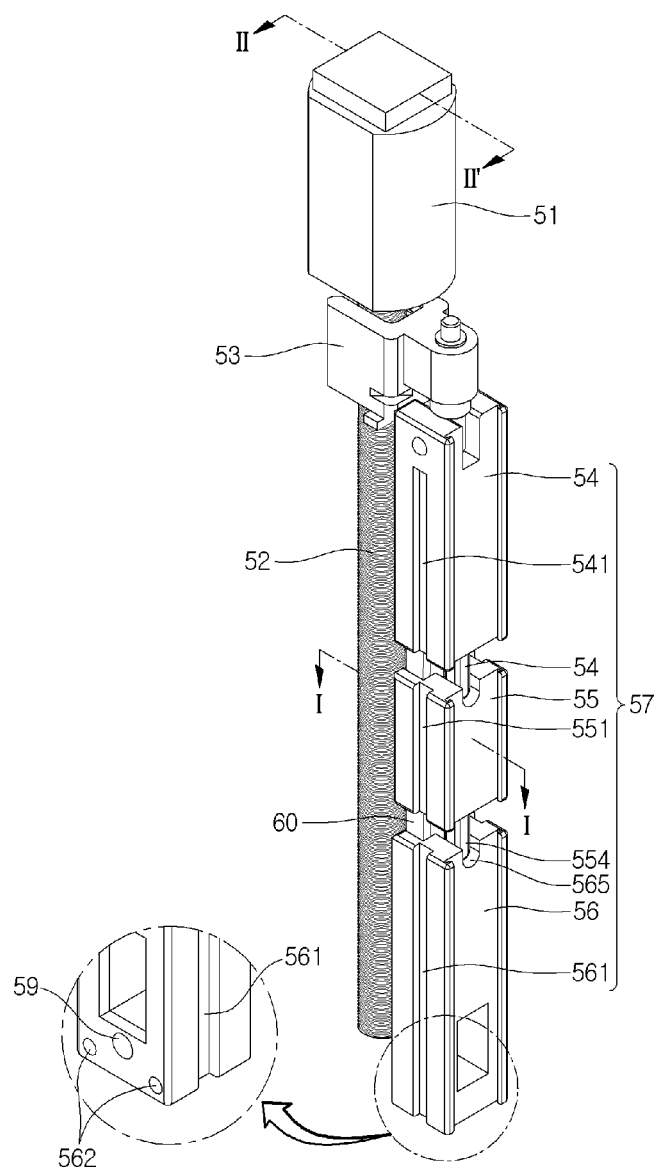
[Fig. 12]

[Fig. 13]
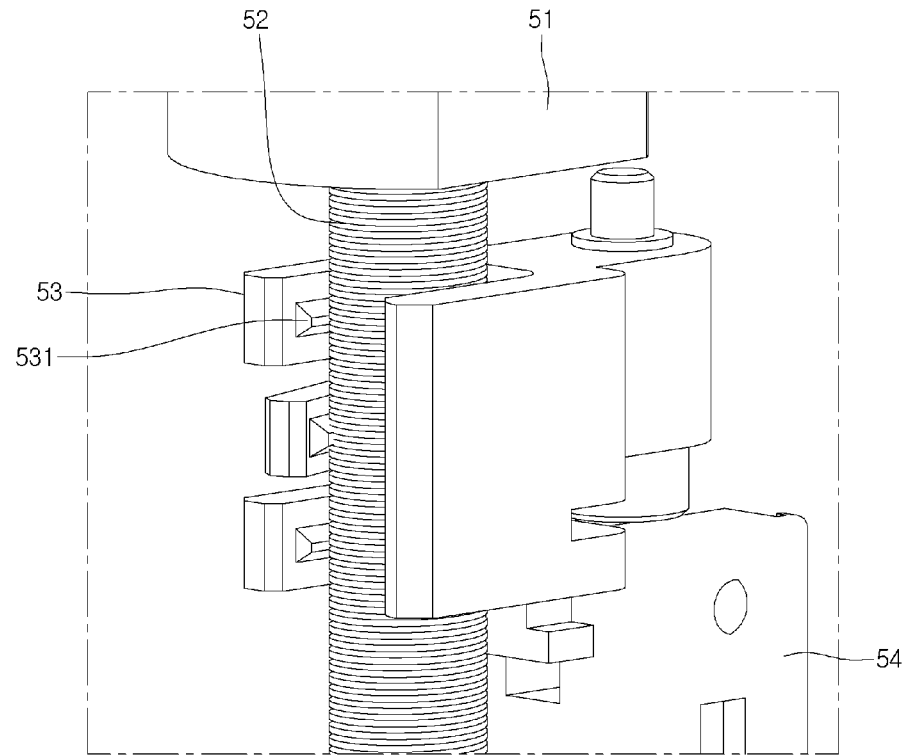
[Fig. 14]
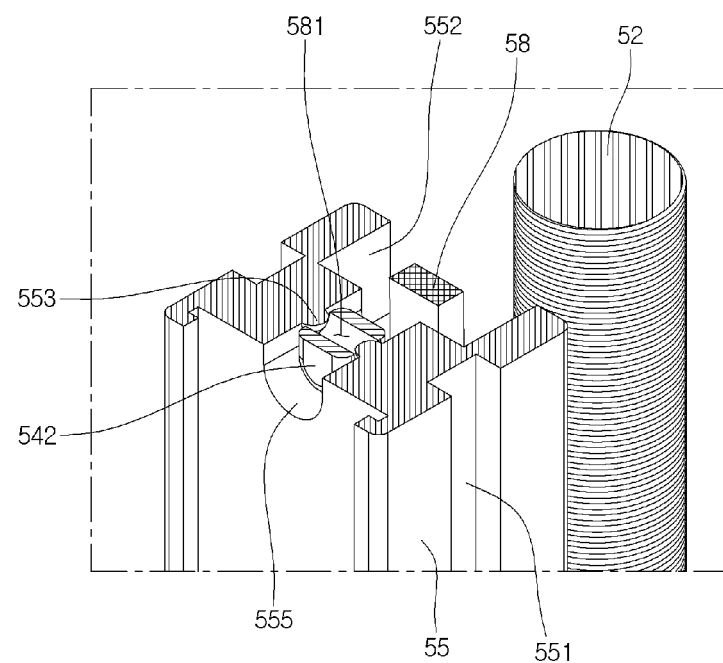

[Fig. 15]
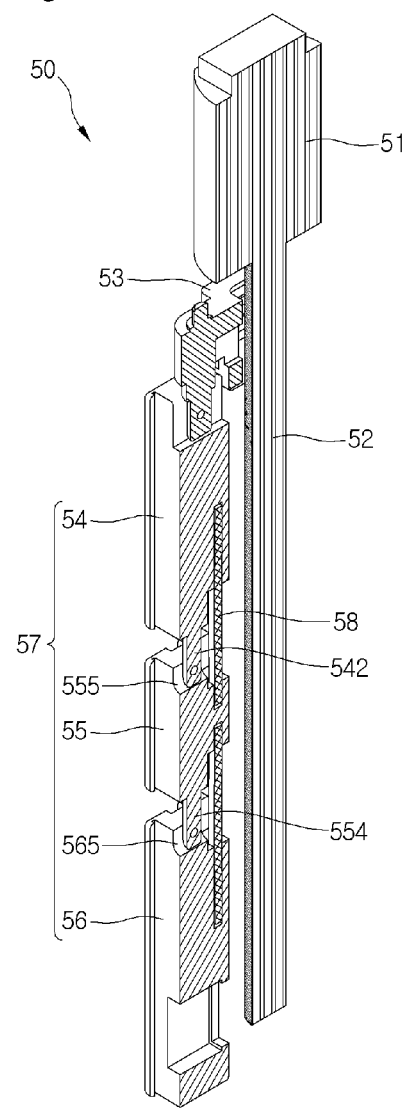

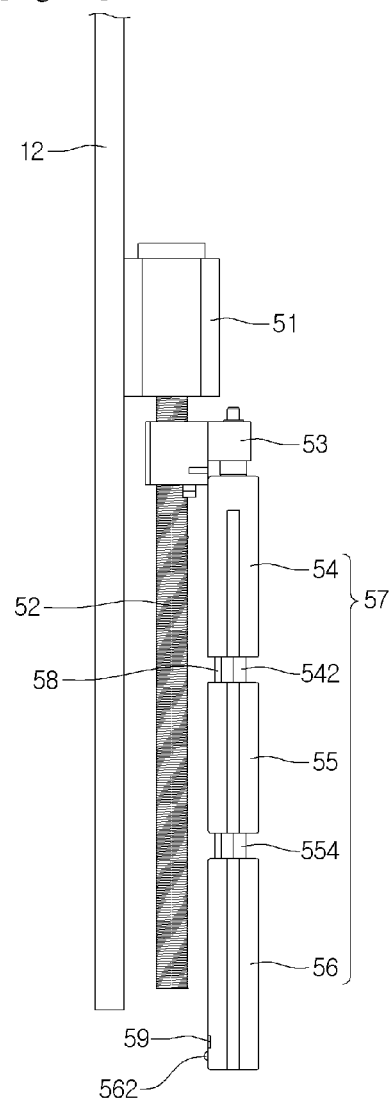
[Fig. 16]

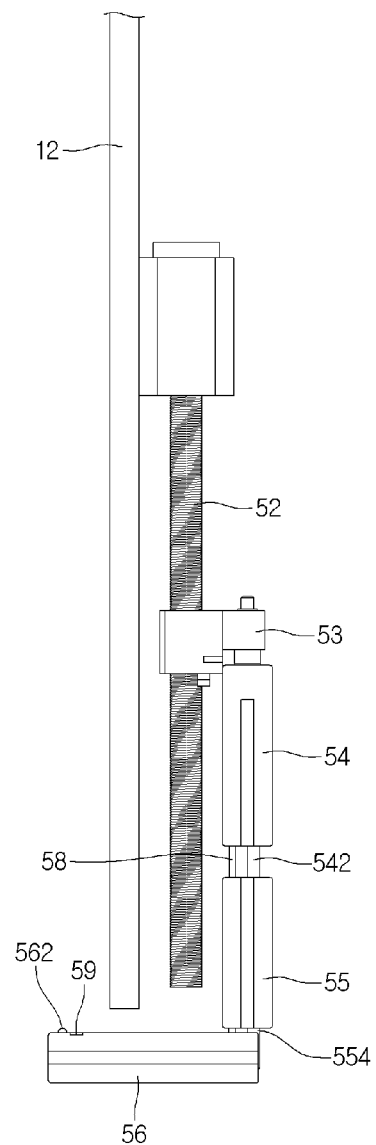
[Fig. 17]

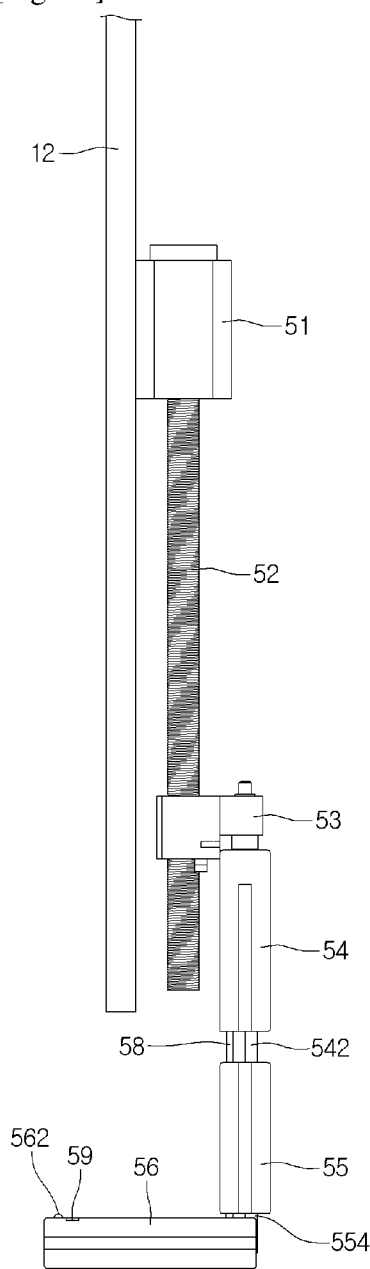
[Fig. 18]

[Fig. 19]
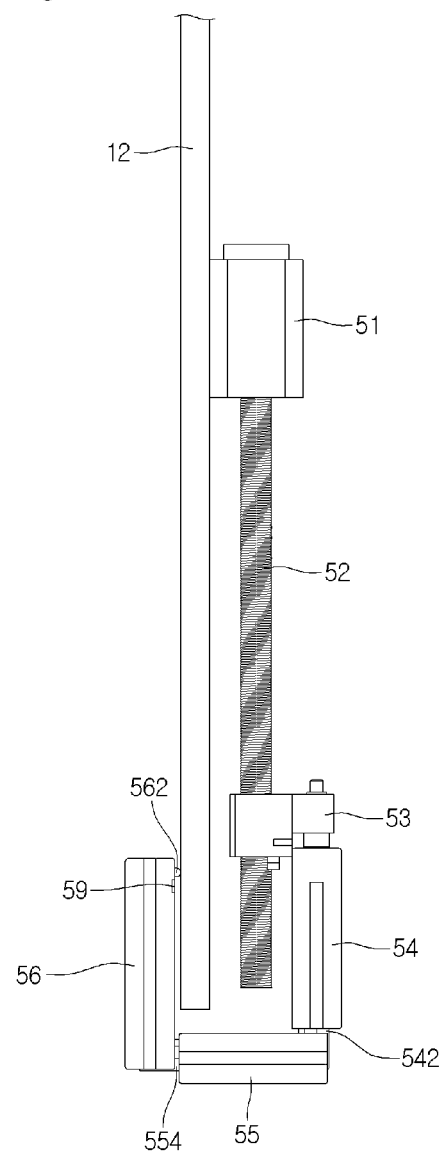

[Fig. 20]
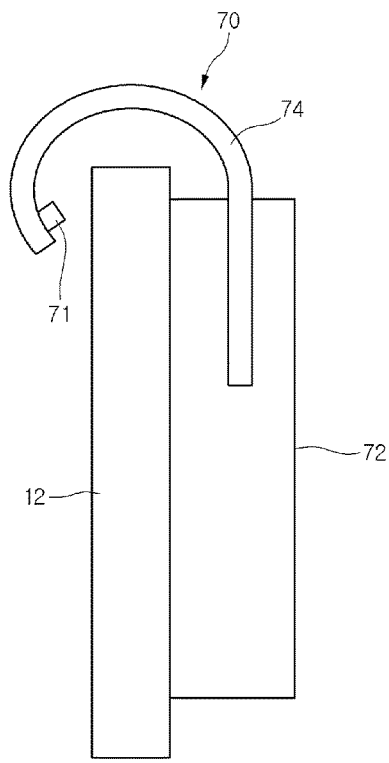
[Fig. 21]
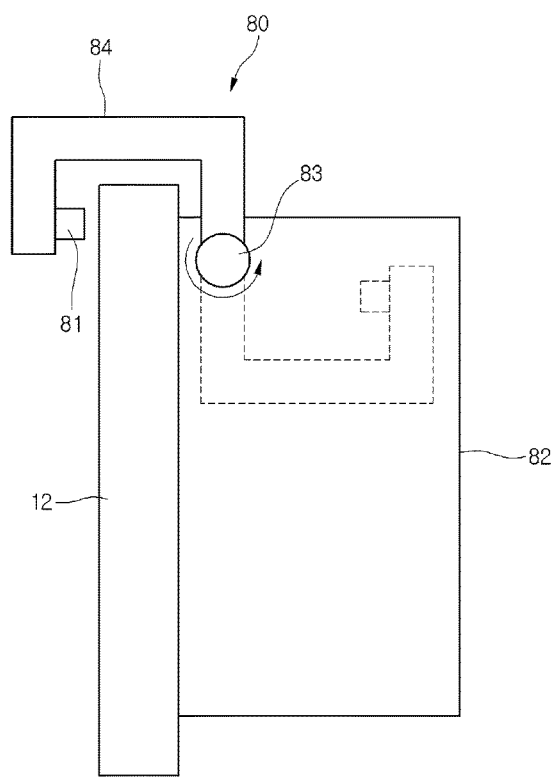

[Fig. 22]
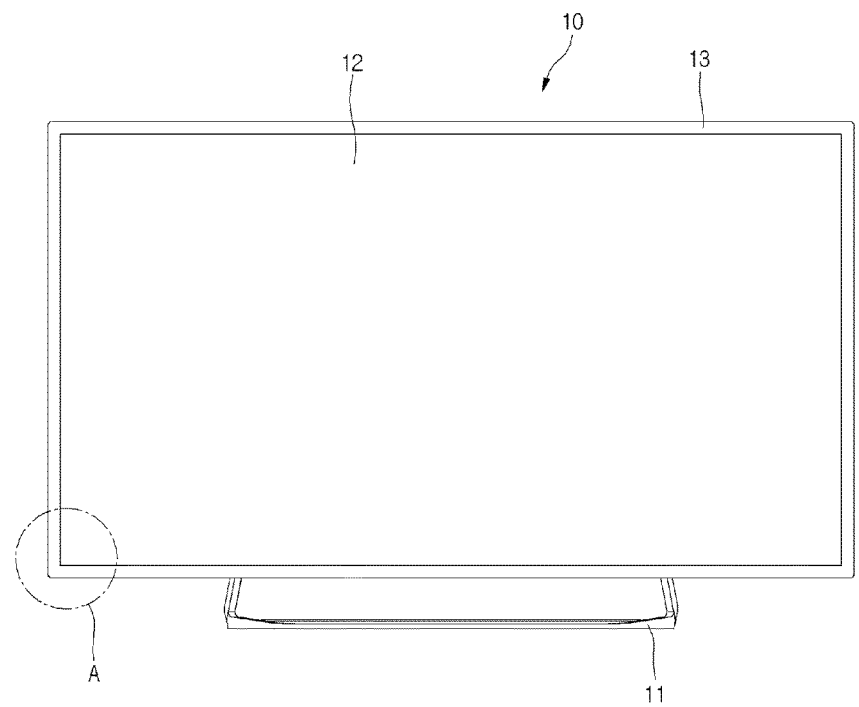
[Fig. 23]
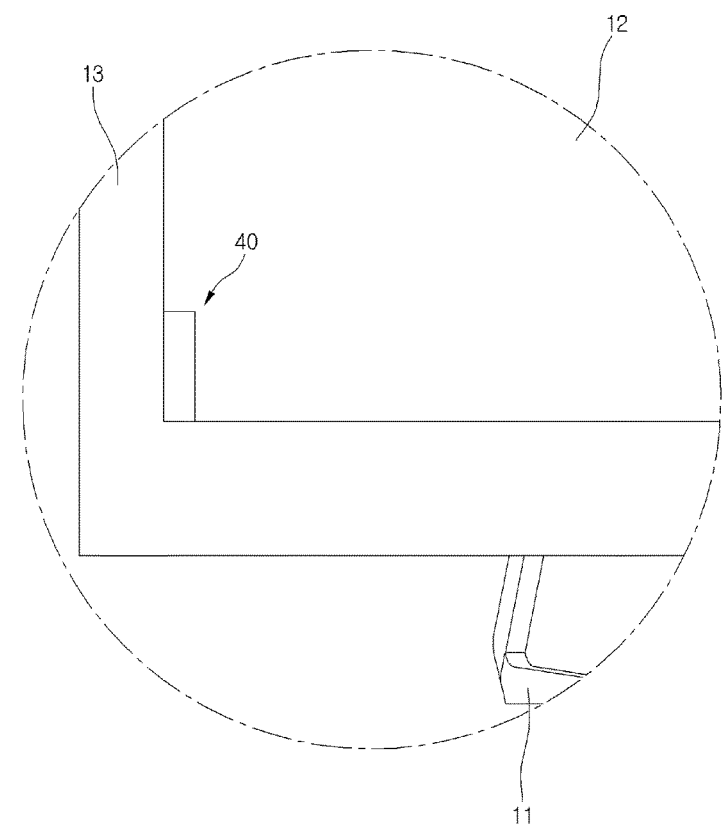

[Fig. 24]
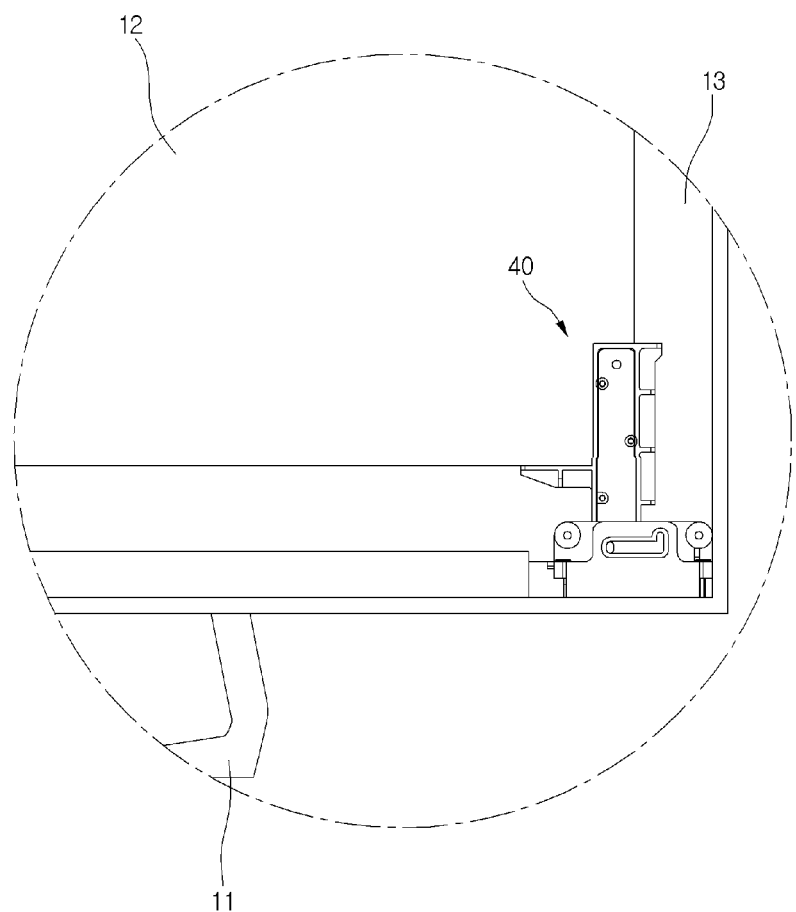

[Fig. 25]
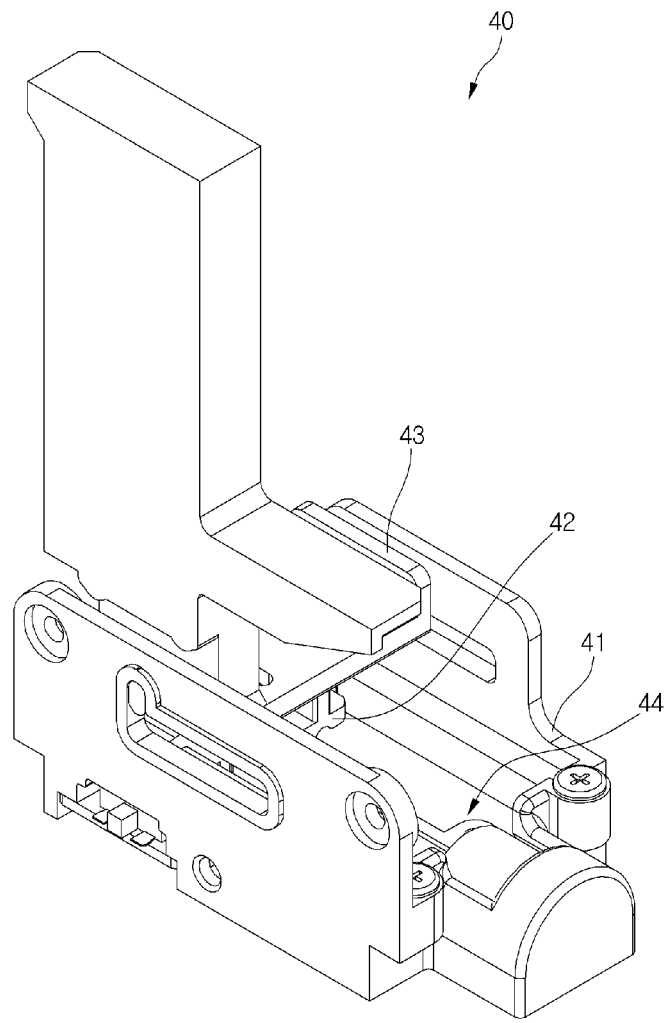

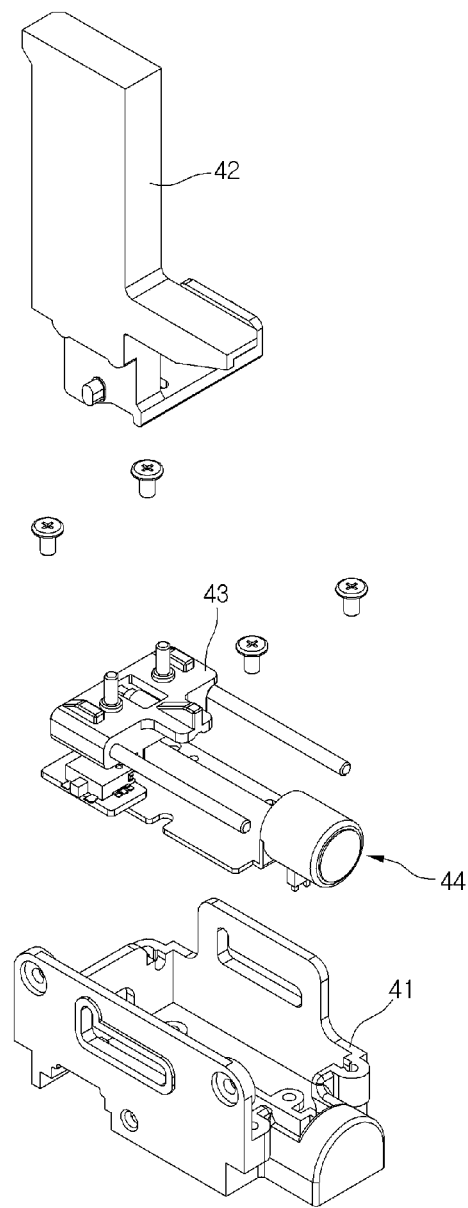
[Fig. 26]

[Fig. 27]
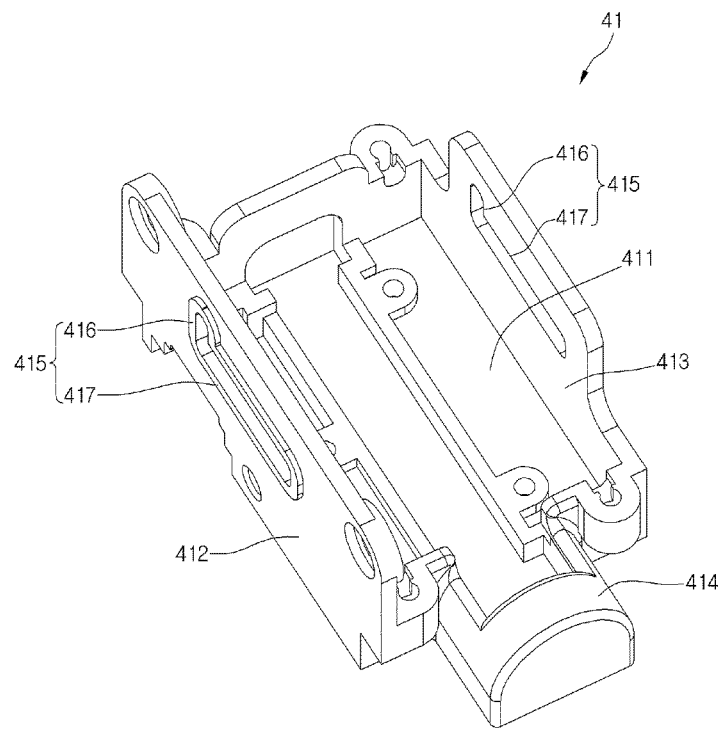
[Fig. 28]
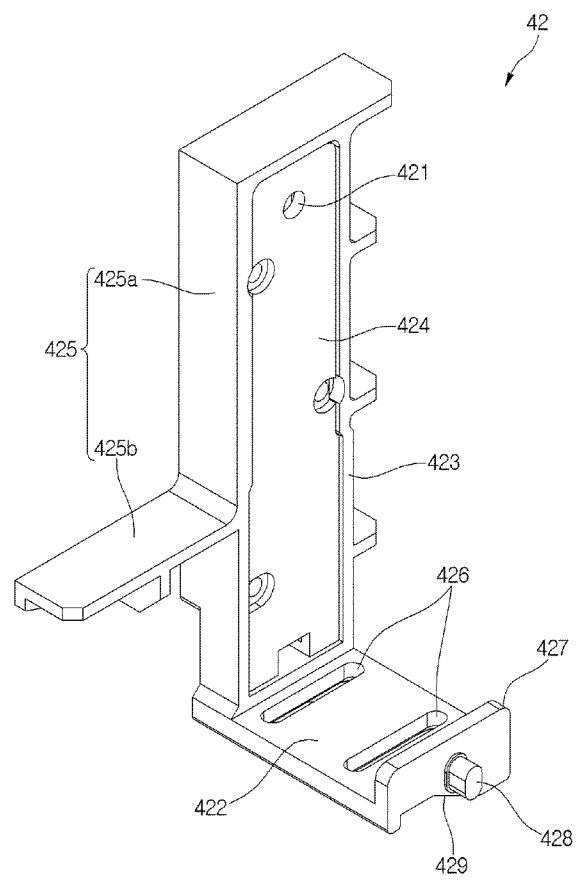

[Fig. 29]
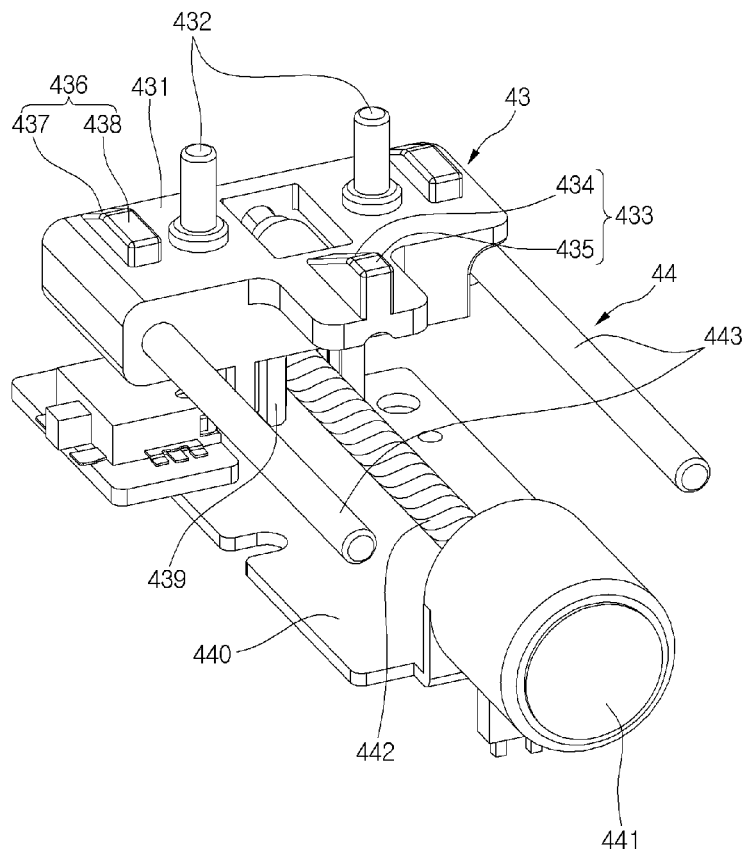
[Fig. 30]
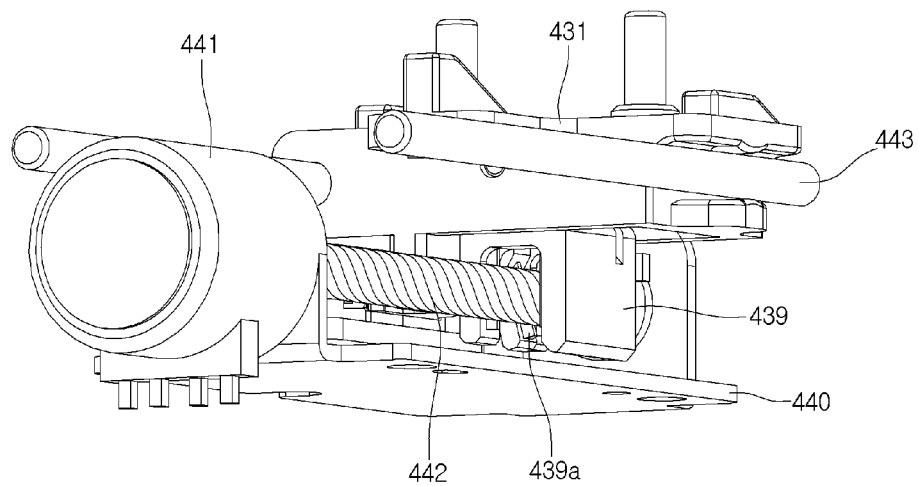

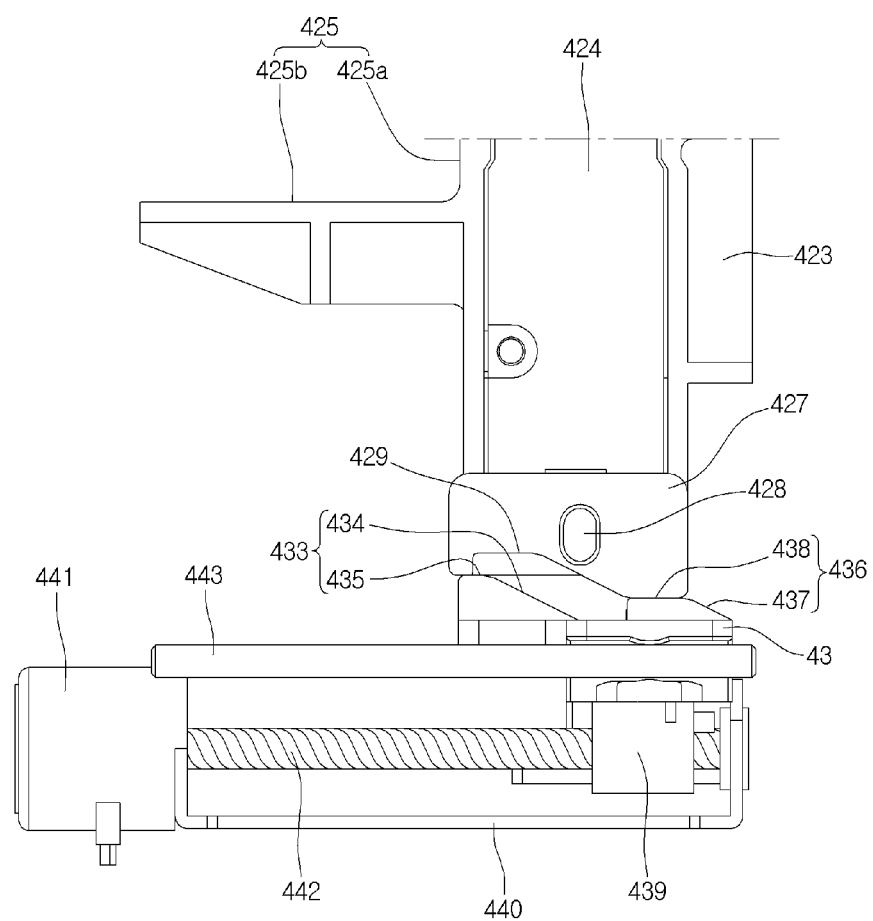
[Fig. 31]

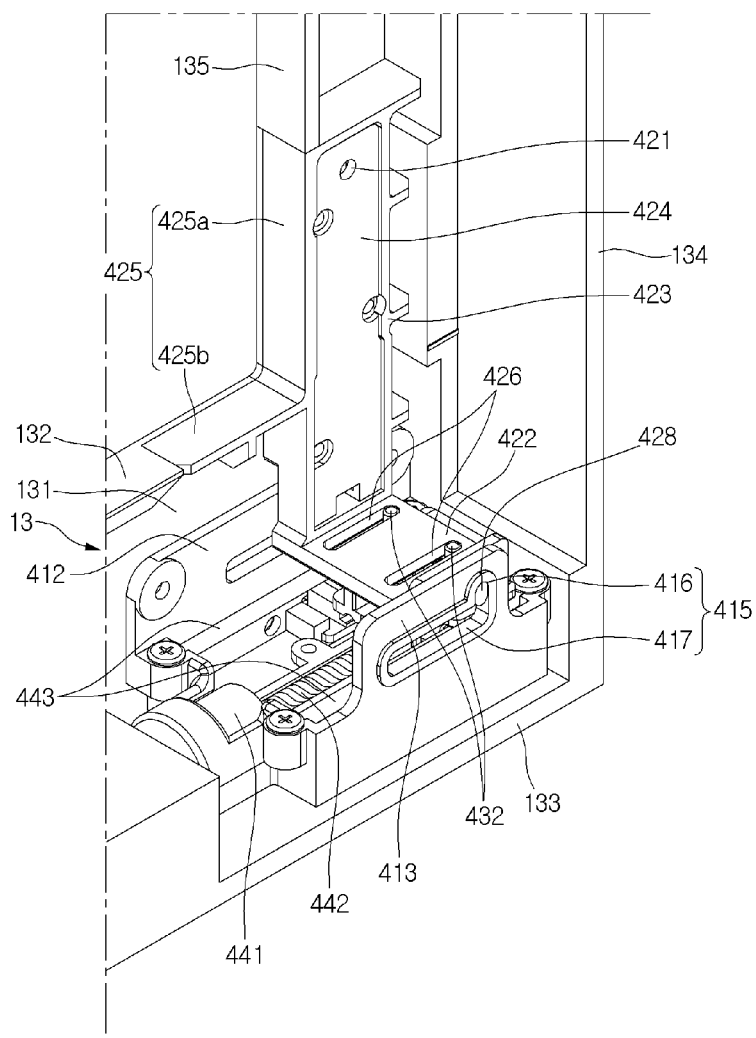
[Fig. 32]

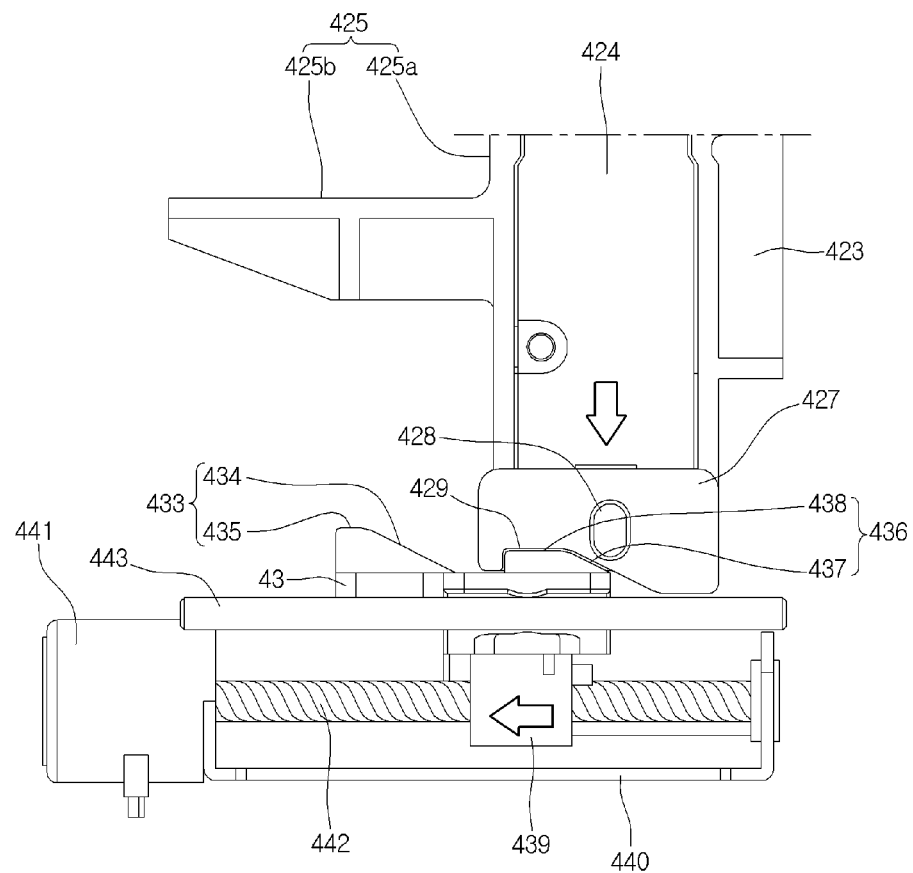
[Fig. 33]

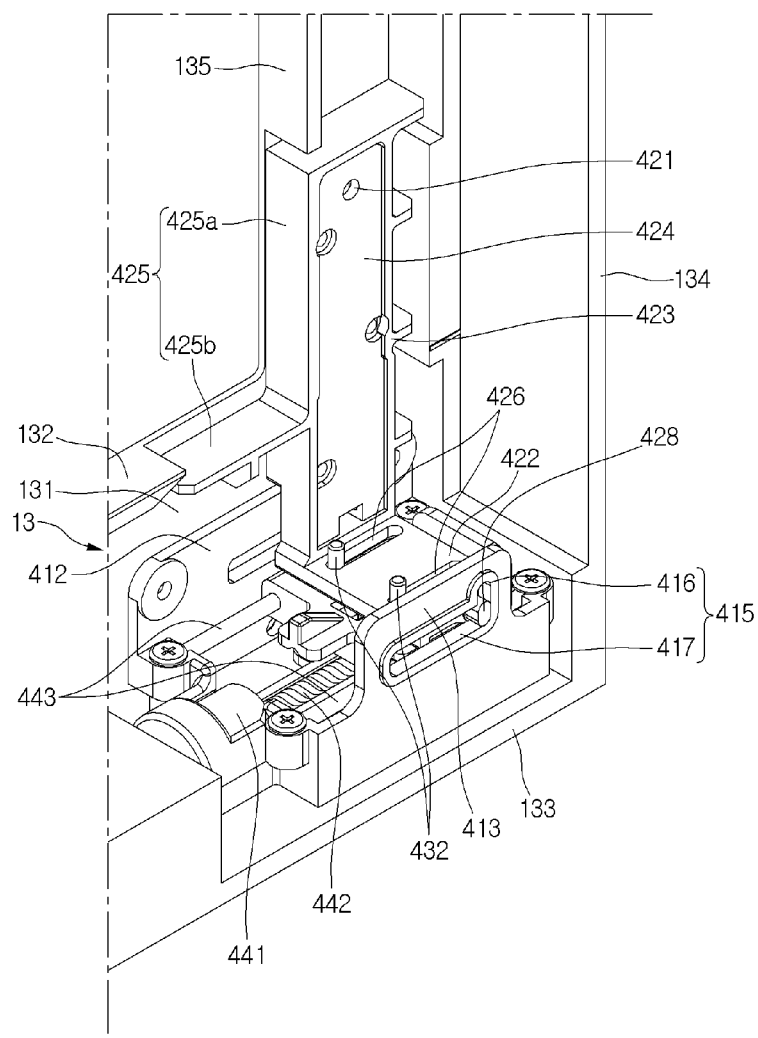
[Fig. 34]

[Fig. 35]
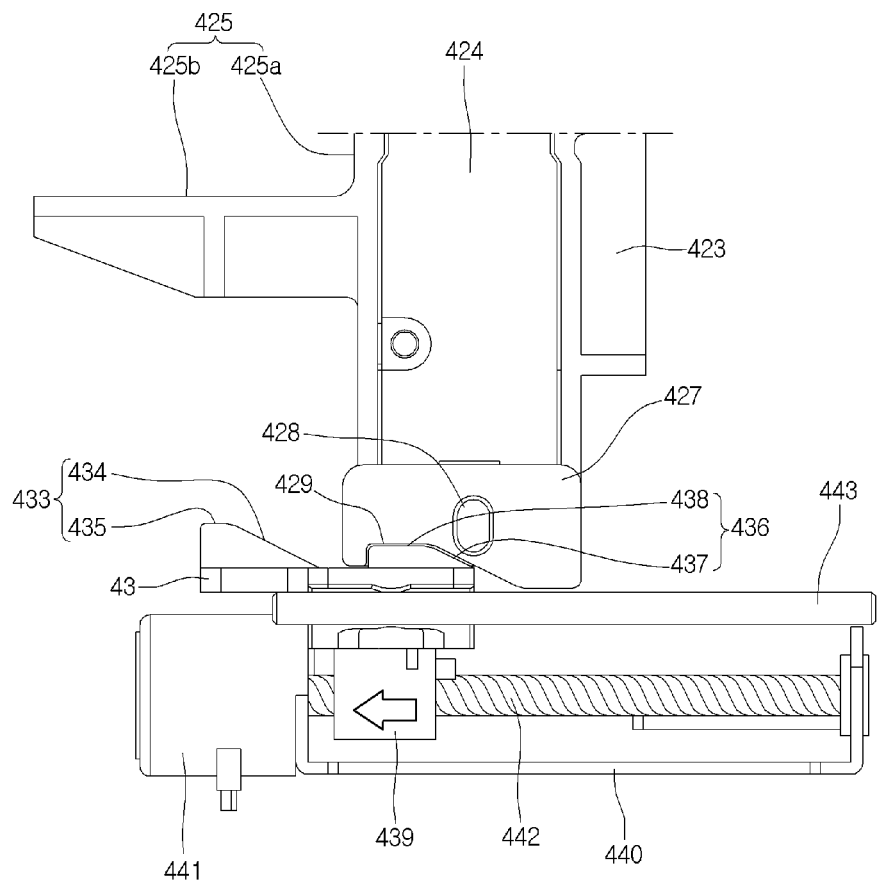

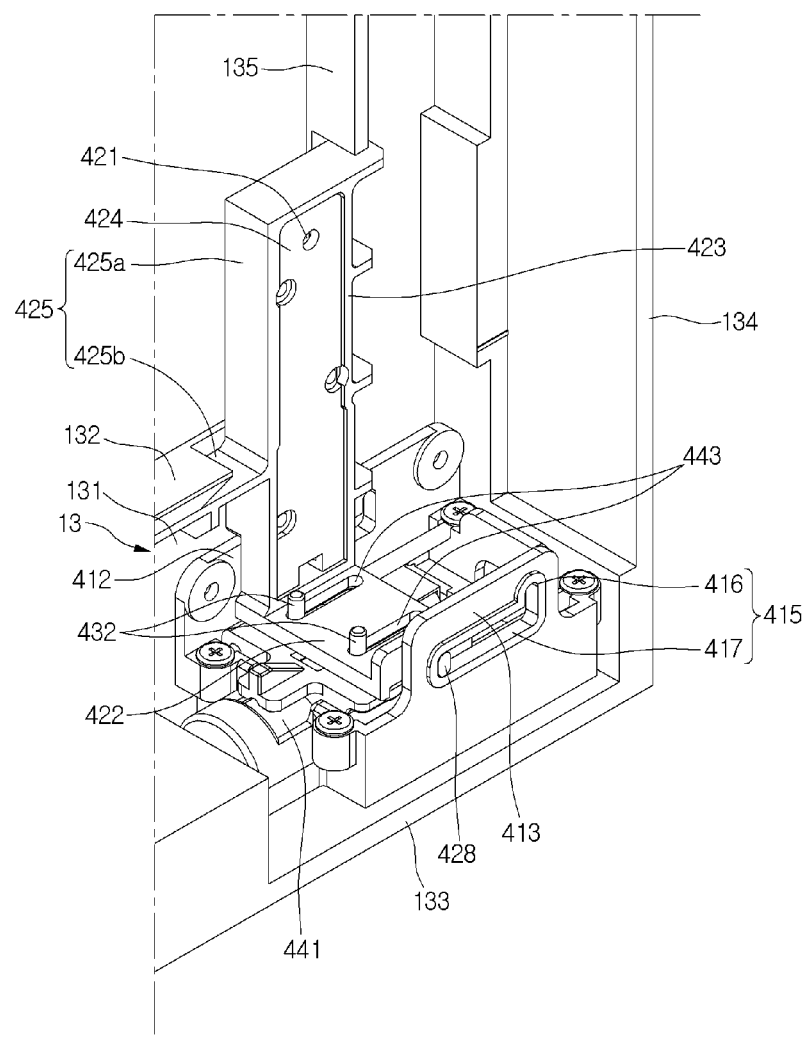
[Fig. 36]

[Fig. 37]
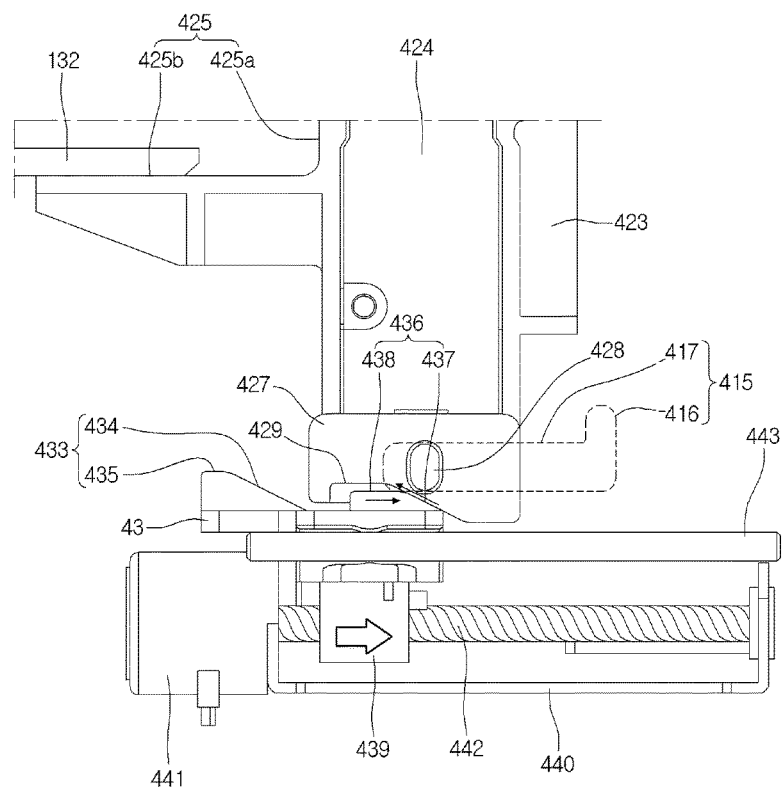
[Fig. 38]
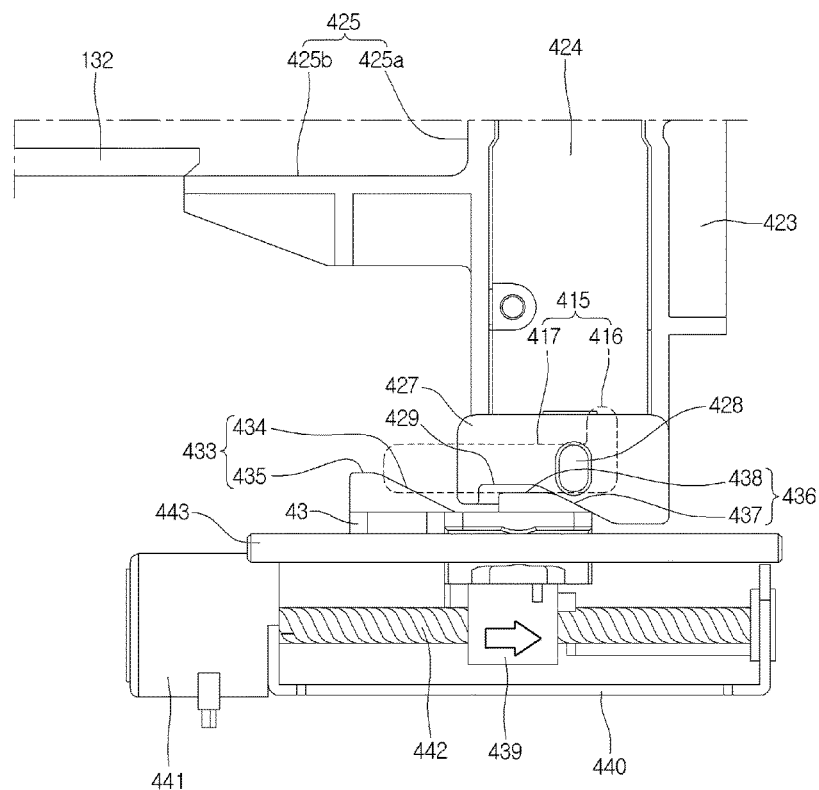

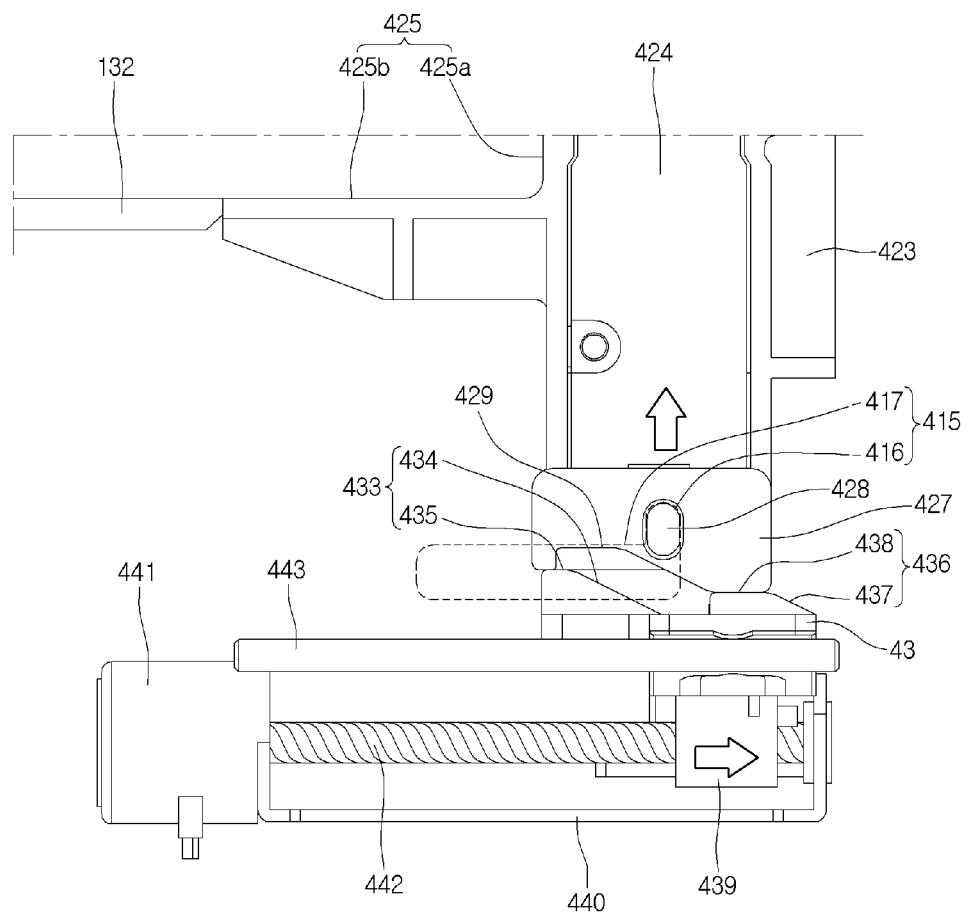
[Fig. 39]

DISPLAY APPARATUS

CROSS-REFERENCE TO RELATED APPLICATIONS

This application is the National Stage filing under 35 U.S.C. 371 of International Application No. PCT/KR2014/004776, filed on May 28, 2014, which claims the benefit of earlier filing date and right of priority to Korean Application Nos. 10-2014-0034663, filed on Mar. 25, 2014, and 10-2014-0055145, filed on May 8, 2014, the contents of which are all hereby incorporated by reference herein in their entirety.

TECHNICAL FIELD

The present invention relates to a display apparatus.

BACKGROUND ART

There is a high-speed digital interface between a main chip and a memory for processing driving of a system, video processing, and audio processing in a display apparatus of a television, or the like. A calibration process is performed according to a temperature and an application for optimizing an operation of the memory.

The calibration of the display apparatus is generally performed during production at a factory and the display apparatus is produced in a state where a specific register setting value is determined.

A related art related to the calibration used in the television, or the like is disclosed in the Korea Patent Registration No. 10-0775889.

In a case of the calibration device of related art, the calibration device is exposed to an outside portion of a bezel by rotating in an corner portion of the bezel. When the calibration device does not operate, the calibration device does not exposed to the outside by positioning a rear side of the bezel.

However, the display apparatus including the calibration device disclosed in the Korea Patent Registration has following problems.

Specifically, an inside rim portion of the bezel corresponding to a rotation locus of the calibration device is to be cut so that the calibration device is exposed to a front side of a display panel by rotating. Due to this, various foreign materials including dust is introduced into an inside portion of the display apparatus through the cut space and thus electrical problems is caused in a drive means for driving the calibration device, as well as the display panel and internal electric components, or a problem of the drive means being not smoothly operated due to the foreign materials is caused.

In addition, in a case of a display device without the bezel itself such as an OLED television, there is a disadvantage of being not capable of adapting the calibration device disclosed in the related art.

DISCLOSURE OF THE INVENTION

Problem that the Invention is to Solve

The present invention is proposed to improve the problems described above.

Means for Solving the Problem

An display apparatus according to the embodiment of an present invention may includes a display panel on which an image is output; and a calibration device which is mounted on a rear surface of the display. The calibration device includes a housing, a drive motor which is disposed on an inside portion or an outside portion of the housing, a link assembly which is accommodated in the inside portion of the housing, which is capable of being withdrawn to the outside of the housing by a power provided form the drive motor and which is provided to be capable of being bent or being rotated, and an photographing unit which is mounted on an end of the link assembly and photographs the image displayed on the display panel.

The link assembly is multi-node links in which a plurality of links are connected in series and which are rotatably interconnected. The lowermost end portion link constituting the multi-node links is capable of rotating by angle which is located on the front surface of the display panel.

The calibration device may further include a torsion spring which is provided on a rotating shaft of the multi-node links and rotates the links.

The calibration device may further include a drive mechanism which transfers a rotational force provided from the drive motor to the link assembly.

The drive mechanism may include a drive gear which is connected to the rotational shaft of the drive motor, and at least one transmission gear which is geared to the drive gear. A rack gear which is engaged with the transmission gear is formed on the side surface of the link assembly.

The calibration device further includes a link movement restriction mechanism for setting a movement limit of the link assembly.

The link movement restriction mechanism includes a lever switch which is mounted on a side of an inside portion of the housing, and an upper engaging jaw and a lower engaging jaw which are formed on the side surface of the link assembly. The lever switch is engaged to the upper engaging jaw or the lower engaging jaw, a movement stopping signal is generated and thus an operation of the drive motor is stopped.

The link movement restriction mechanism includes a magnet which is mounted on an upper side and a lower side of the link assembly, and a hall sensor which is mounted on the inside portion of the housing and detects a magnetic field generating from the magnet. When a detect signal is generated from the hall sensor, the operation of the drive motor is stopped.

The calibration device may further include at least one guide ribs which are projected from the inside surface of the housing and extend in the movement direction of the link assembly; and at least one guide grooves which are formed to be depressed on an outer peripheral surface of the link assembly in a position corresponding to the at least one guide ribs.

The calibration device further include a leaf spring which is provided on a side of the multi-node links and rotates the links.

The calibration device further includes a drive mechanism which transfers a rotational force provided from the drive motor to the link assembly and thus causes the link assembly to be moved in the vertical direction. The drive mechanism further includes a lead screw which is connected to the rotational shaft of the drive motor, and a link holder which is mounted on the outer peripheral surface of the lead screw and moves in the vertical direction along the lead screw when the lead screw rotates. An upper end portion of the link assembly is mounted on the link holder.

The link assembly may be a bendable link which is capable of extending and being gently bent in a curved shape.

The calibration device further includes a hinge shaft which is provided in an inside portion of the housing, to which an end of the link assembly is connected and which rotates by the drive motor. The link assembly may be a link which is bent in a U-shape.

The calibration device performs a calibration process by automatically operating before reproduction of a particular content through the display panel or when a particular event generates. The particular content may include at least one of an ultra high definition video content, a content having many motions, films, and nature documentaries.

The particular event may include at least any one of gallery entry having high resolution photograph, specific website entry, application execution required high resolution, a broadcast additional information reference situation.

The particular event may include at least one of a case where the average image quality falls into a value which is equal to or less than a set value by the display apparatus not turning on for a long period of time, a case where temperature change is generated, and a case where the scene changes during the content reproduction.

The calibration device may perform a calibration process by operating at the same time as turning off of the display panel.

The calibration device may perform a calibration process by operating at the same time as turning on of the display panel and after the calibration process is terminated the content may be displayed on the display panel.

The reproduction of the content may be paused until the termination of the calibration process, in a case where the calibration process is performed by the calibration being operated during the content reproduction.

A display apparatus according to another embodiment of the present invention includes a display panel on which an image is output; a bezel which has a tetragonal frame shape and surrounds the edge of the display panel; and a calibration device which is disposed between a front surface of the display panel and a rear surface of the bezel and which has an photographing unit which photographs a calibration screen displayed on the display panel. The photographing unit is positioned on the front side of the display panel by sliding from the rear side of the bezel to the center direction of the display panel.

The calibration device may include a housing which is fixed to the rear surface of the bezel, a transfer module which is mounted on the housing, a moving member which horizontally moves along the transfer module in a state of connecting to the transfer module, and a slider which has a rear surface on which the photographing unit is mounted, which is disposed on the upper surface of the moving member and which is exposed to the outside by sliding to the any region of the front portion of the display panel while escaping from the inside rim of the bezel.

The bezel includes a front surface portion which covers a front surface edge of the display panel, an inside portion which is bent in the rear side direction from an inside end portion of the front surface portion, and an outside portion which is bent in the rear side direction from an outside end portion of the front surface portion. The inside portion includes a horizontal inside portion, a vertical inside portion which is intersected with the horizontal inside portion and at least a portion of a corner region which meets the horizontal inside portion and the vertical inside portion with each other is cut. The slider moves along a space of the cut inside portion in the horizontal direction.

The slider may include a seating portion, a supporting portion which extends from a front end portion of the seating portion in the upper side direction, a bent portion which extends from a rear end portion of the seating portion in the upper side direction, a guide projection which projects from an outside surface of the supporting portion and an outside surface of the bent portion, and a bezel connection portion which forms a portion of the inside portion of the bezel in a default state where the slider is positioned on the rear side of the bezel.

The bezel connection portion extends from a side surface of the supporting portion in the horizontal direction, and may include a horizontal connection portion which forms the same plane with the horizontal inside portion at the default state, and a vertical connection portion which is defined by a portion of the side surface of the supporting portion on which the horizontal connection portion is formed and forms the same plane with the vertical inside portion at the default state.

The slider may further include a pair of guide holes which extend from the front end portion and the rear end portion of the seating portion in the lateral direction of the seating portion.

The transfer module includes a drive motor, a lead screw which is connected to the rotating shaft of the drive motor, and one or more transfer guide bars which support the moving member and guides sliding movement of the moving member. The transfer guide bar penetrates through the moving member or supports the moving member by being in close contact with the lower surface of the moving member.

The moving member may include a main body portion which horizontally moves along the transfer guide bar in the lateral direction, a lead screw holder which is formed on the lower surface of the main body portion and is coupled to the outer peripheral surface of the lead screw, a supporting projection which projects from the upper surface of the lead screw, a pair of transfer projections which are formed at the points facing each other in the longitudinal direction at the point spaced apart from the supporting projection, and a pair of guide bosses which project from the upper surface of the lead screw and are inserted into the pair of guide holes respectively.

The supporting projection and the pair of transfer projections may includes an inclined surface which is inclined in the upper side direction, and a planner surface which extends at the end portion of the inclined surface in the horizontal direction.

The housing includes a bottom portion, a front surface wall which extends from a front end portion of the bottom portion in the upper side direction, a rear surface wall which extends from a rear end portion of the bottom portion in the upper side direction, and a motor housing which is formed on the side surface of the bottom portion and accommodates at least a portion of the drive motor. A moving member guide holes for inserting the guide projections are formed in the front surface wall and the rear surface wall respectively.

The moving member guide holes may include a vertical hole, and a horizontal hole which extends from a lower end of the vertical hole in the transverse direction.

An engaging groove into which the transfer projection is inserted is formed in a depressed shape on the lower surface of the seating portion and the engaging groove is depressed in the same shape as the shape of the transfer projection.

When the drive motor rotates in a first direction, the lead screw rotates in the first direction, and when the lead screw rotates, the leas screw holder moves along the lead screw, and the moving member slides along the transfer guide bar in the direction which is approaching to the drive motor.

When the moving member moves in the direction which is approaching to the drive motor, the guide boss moves from an end of the guide hole to the other end thereof and the transfer projection is seated on the engaging groove and the guide projection is lowered from the upper end of the vertical hole to the lower end thereof.

In a state where the guide boss is in contact with the other end of the guide hole, the transfer projection is seated in the engaging groove, and the guide projection is in contact with a lower end of the vertical hole, the slider and the moving member moves as one body, and the photographing unit positions on the front side of the display panel after escaping from the inside portion of the bezel.

The horizontal connection portion positions on the lower side of the horizontal inside portion in a state where the guide projection is in contact with a lower end of the vertical hole.

When the guide projection moves to the end portion of the horizontal hole, the slider stops and the photographing unit operates.

Advantage of the Invention

A calibration device according to the first to the fourth embodiments of the present embodiment having configuration described above has advantages as follows:

First, it is applicable to a display apparatus in which a bezel is not provided, that is, an OLED television structure, since the calibration device is mounted on the rear surface of the display panel.

Second, The repair and replacement of calibration device is easy since it is easy to separate the calibration device only by the calibration device being mounted on the rear surface of the display panel.

Third, there is an advantage of being not disturbance at a screen viewing since an photographing unit moves from the rear surface of the display panel to the front surface thereof in the calibration process and is concealed in the rear surface of the display panel when the calibration process is not performed.

An display apparatus having the calibration device according to the fifth embodiment of the present invention has advantages as follows.

The calibration device is not exposed to the outside when the calibration operation is not performed, since the calibration device is provided on a rear side of the bezel.

Foreign materials are prevented from being introduced through the bezel to the calibration device by a portion of the calibration device forming a portion of the inside rim portion of the bezel.

It is possible for the display panel to be large due to space formation for accommodating the calibration device by downsizing the calibration device to a size corresponding to the width of the bezel.

BRIEF DESCRIPTION OF THE DRAWINGS

FIG. 1 is a front view illustrating a display apparatus having a calibration device according to a first embodiment of the present invention.

FIG. 2 is a rear view illustrating the display apparatus.

FIG. 3 is a front perspective view illustrating the calibration device according to the first embodiment of the present invention.

FIG. 4 is a rear perspective view illustrating the calibration device.

FIG. 5 is an exploded perspective view illustrating inner portion structure of the calibration device according to the first embodiment of the present invention.

FIG. 6 is a front perspective view illustrating a link assembly provided to the calibration device according to the first embodiment of the present invention.

FIG. 7 is a rear perspective view illustrating the link assembly.

FIG. 8 to FIG. 10 are views sequentially illustrating states where the link assembly of the calibration device drives for calibration operation.

FIG. 11 is a perspective view illustrating a calibration device according to a second embodiment of the present invention.

FIG. 12 is a perspective view illustrating an inner structure of the calibration device.

FIG. 13 is an enlarged perspective view illustrating a link holder.

FIG. 14 is a cross-sectional view taken along a I-I line in the FIG. 12.

FIG. 15 is a longitudinal-sectional view taken along a II-II line in the FIG. 12.

FIG. 16 to FIG. 19 are views sequentially illustrating states where the link assembly of the calibration device drives for calibration operation.

FIG. 20 is a conceptual side view illustrating a calibration device according to a third embodiment of the present invention.

FIG. 21 is a conceptual side view illustrating a calibration device according to a fourth embodiment of the present invention.

FIG. 22 is a front view illustrating a display apparatus having a calibration device according to a fifth embodiment of the present invention and the calibration device.

FIG. 23 is a partial front view illustrating a display apparatus in a state where the calibration device according to the fifth embodiment of the present invention is operated.

FIG. 24 is a partial rear view illustrating a display apparatus in a state where the calibration device is operated.

FIG. 25 is a front perspective view illustrating the calibration device according to the fifth embodiment of the present invention.

FIG. 26 is an exploded perspective view illustrating the calibration device.

FIG. 27 is a perspective view illustrating a housing constituting a calibration device according to the fifth embodiment of the present invention.

FIG. 28 is a perspective view illustrating a slider constituting a calibration device according to the fifth embodiment of the present invention.

FIG. 29 is a perspective view illustrating a state where a moving member constituting the calibration device according to the fifth embodiment of the present invention is mounted on the transfer module.

FIG. 30 is a partial perspective view viewing from a lower surface of the moving member.

FIG. 31 is a rear view illustrating the calibration device according to the fifth embodiment of the present invention in a default state.

FIG. 32 is a rear perspective view of a bezel illustrating a position of the calibration device in a default state.

FIG. 33 is a side view illustrating the calibration device according to the fifth embodiment of the present invention viewing an operating start state.

FIG. 34 is a rear perspective view of the bezel illustrating a position of the calibration device in the operating start state.

FIG. 35 is a rear view illustrating the calibration device according to the fifth embodiment of the present invention in a state where the slider is moved to the maximum.

FIG. 36 is a rear perspective view of the bezel illustrating a position of the calibration device in a moving state to the maximum.

FIG. 37 is a rear view illustrating the calibration device according to the fifth embodiment of the present invention viewing a moving start state to an original position.

FIG. 38 is a rear view illustrating the calibration device according to the fifth embodiment of the present invention in a state where a horizontal connection portion of a slider is in a position escaping from an inner horizontal portion of the bezel.

FIG. 39 is a rear view illustrating the calibration device according to the fifth embodiment of the present invention viewing a state of returning to the original position.

BEST MODE FOR CARRYING OUT THE INVENTION

Hereinafter, an configuration and an operation of a display apparatus having a calibration device according to a first embodiment of the present invention and the calibration device will be described in detail with reference to drawings.

FIG. 1 is a front view illustrating a display apparatus having a calibration device according to the first embodiment of the present invention, and FIG. 2 is a rear view illustrating the display apparatus.

With reference to FIG. 1 and FIG. 2, a display apparatus 10 according to the first embodiment of the present invention includes a display panel 12 on which an image is output, a stand 11 which supports the display panel 12, and a calibration device 20 which is mounted on a rear surface of the display panel 12.

FIG. 3 is a front perspective view illustrating the calibration device according to the first embodiment of the present invention, and FIG. 4 is a rear perspective view illustrating the calibration device.

With reference to FIG. 3 and FIG. 4, the calibration device 20 according to the first embodiment of the present invention includes a housing 200, a link assembly 23 which is withdrawn from the housing 200 to the outside or is retracted from the outside into an inner portion of the housing 200, and an photographing unit 34 which is provided on the front surface of the lower end portion of the link assembly 23.

Specifically, the housing 200 may include a case 21 in which a space for accommodating various components in an inner portion thereof is formed and of which a rear surface is opened, and a cover 22 which covers the opened rear surface of the case 21.

Hereinafter, a detailed structure of the calibration device 20 will be described in more detail with reference to drawings.

FIG. 5 is an exploded perspective view illustrating inner structure of the calibration device according to the first embodiment of the present invention.

With reference to FIG. 5, the link assembly 32 on which the photographing unit 34 is mounted is installed in a movable manner in the vertical direction in a side of the inner portion of the case 21 and a drive mechanism 30 which drives the link assembly 23 is placed on a side of the link assembly 23. A lever switch 24 is provided on the other side of the link assembly 23 and thus the lever switch detects the maximum withdrawing point in time and the maximum retracting point in time. A signal which is detected by the lever switch 24 is sent to a control unit of the calibration device 20 and thus the control unit stops an operation of the drive mechanism 30 to stop lowering or raising of the link assembly 23. Here, another type of detecting means in addition to the lever switch 24 as a means for detecting the stopping point in time of the link assembly 23 may be applied. For example, magnets are mounted on the side surfaces of the lower end portion and the upper end portion of the link assembly 23 and a hall sensor which detects a magnetic force generating from the magnet may be mounted on a side of the inner portion of the case 21 corresponding to the point facing the magnet.

Meanwhile, a fastening hook 212 projects from the upper end of the rear surface of the case 21 and a hook engaging end 222 to which the fastening hook 212 is engaged may be formed on the upper end portion of the cover 22. When the cover 22 is mounted on the opened rear surface of the case 21, the fastening hook 212 is engaged to the hook engaging end 222. The cover 22 may be fixed to the case 200 using fastening members such as a screw.

In addition, a vertical movement of the link assembly 23 is guided by a pair of sliding guide ribs 211 being formed to extend in the vertical direction in a state of being spaced apart from each other on the rear surface of the case 21. A vertical movement of the link assembly 23 is guided in a state of being in close contact with the rear surface of the link assembly 23 by a sliding guide rib 221 being formed to vertically extend in the front surface of the cover 22.

Specifically, the drive mechanism 30 which cause the link assembly 23 to be moved in the vertical direction includes a drive motor 31, a drive gear 32 which is connected to a rotating shaft of the drive motor 31, and a transmission gear which is connected to the drive gear 32, receives a rotating force which is generated from the drive motor 31 and the rotating force is transferred to the link assembly 23. The transmission gear 33 may include a first transmission gear 331 which is geared to the drive gear 32, a second transmission gear 332 which is geared to the first transmission gear 331, and a third transmission gear 333 which is connected to the second transmission gear 332 and the side surface of the link assembly 333. However, the form of the transmission gear 33 is not limited to the embodiment described above, and transmission gears having various forms and types may be provided. In other words, any form of a transmission gear configuration which may transfer a rotating force generating from the drive motor 31 to the link assembly 23 are also possible in addition to the embodiment described above.

FIG. 6 is a front perspective view illustrating a link assembly provided to the calibration device according to the first embodiment of the present invention, and FIG. 7 is a rear perspective view illustrating the link assembly.

With reference to the FIG. 6 and FIG. 7, the link assembly 23 according to the an embodiment of the preset invention may be a structure in which a first link 25, a second link 26 and a third link 27 are connected to each other by a hinge 28. An elastic member such as a torsion spring 29 is provided in the hinge 28 which connects the links to each other and thus a second link 26 and a third link 27 are capable of rotating up to 90 degrees about the hinge 28.

Specifically, a sliding guide groove 251 is formed to be stepped in the edges of right and left sides of the first link 25 and thus the sliding guide rib 211 provided to the case 21 is seated. A rack gear 252 is formed on the left side surface of the first link 25 and thus the third transmission gear 333 is geared. Accordingly, when the third transmission gear 333 rotates in one direction, the link assembly 23 including the first link 25 is lowered, and when the third transmission gear 333 rotates in another direction, the link assembly 23 is raised. A lever groove 254 extends in a stepped shape with a predetermined depth in the lower side direction in the left side edge of the rear surface of the first link 25, that is, an opposite side edge to the surface on which the rack gear 252 is formed. The lever switch 24 is disposed on the lever groove 254. A upper engaging jaw 255 is formed on the upper end portion of the lever groove 254 and when the lever switch 24 is engaged to the upper engaging jaw 255 while the first link 25 is lowered, a link stop signal is generated. When the link stop signal is transferred to the control unit, power supply is cut off to the drive motor 31. A central guide groove 253 is formed on the rear surface center of the first link 25 and the central guide groove 253 extends from the upper end portion to the lower end portion of the rear surface of the first link 25. When the cover 22 is coupled to the case 21, the sliding guide rib 221 formed on the cover 22 is seated on the central guide groove 253 and thus the movement of the link assembly 23 in the vertical direction is guided.

Further, a compartment rib 264 projects in the center of the right side surface of the second link 26 and extends by a predetermined length in the longitudinal direction of the second link 26. The sliding guide rib 211 of the case 21 is disposed on the front side of the compartment rib 264 and the lever switch 24 is disposed on the rear side of the compartment rib 264. In other words, when the link assembly 23 raises or lowers, the lever switch 24 passes by the rear surface of the compartment rib 264. A rack gear 262 is formed on the left side surface of the second link 26 and thus the third transmission gear 333 is geared. A sliding guide groove 261 is formed on the front edge of the second link 26 of side on which the rack gear 262 is formed and the sliding guide rib 211 is seated on the sliding guide groove 261. The sliding guide rib 221 is accommodated by the central guide groove 263 being formed from the central upper end portion of the rear surface of the second link 26 to the lower end portion.

In addition, A guide grooves 271 are formed on right and left side edges of the front surface of the third link 27 and the sliding guide rib 211 of the case 21 is seated on the guide grooves 271. A rack gear 272 is formed on the right side edge of the rear surface of the link 27 and thus is engaged with the third transmission gear 333. A lever groove 274 extends in a stepped shape with a predetermined depth in the lower side direction in the left side edge of the rear surface of the third link 27, that is, an opposite side edge to the surface on which the rack gear 272 is formed. The lever switch 24 is disposed on the lever groove 274. A lower engaging jaw 275 is formed on the lower end portion of the lever groove 274. Specifically, when the lever switch 24 is engaged to the lower engaging jaw 275 while the third link 27 is raised, a link stop signal is generated and thus power supplied to the drive motor 31 is cut off. A central guide groove 273 is formed in the center of the rear surface of the third link 27.

Meanwhile, an photographing unit 34 such as a camera is mounted on the lower end portion region of the front surface of the third link 27 and thus photographs image displayed on the display panel 12 for calibration. The front surface of the third link 27 is capable of being spaced apart from the front surface of the display panel 12 by a predetermined interval without completely being in contact with the front surface of the display panel 12 in the calibration process by one or a plurality of separated projections 272 projecting from a side of the front surface of the third link 27. This is to increase a quality of an image photographed by the photographing unit 34 by the front surface of the third link 27 being slightly spaced apart from the display panel 12.

By this structure, the central guide grooves 253, 263, 273 which are formed on the centers of the rear surfaces of the first to the third links 25, 26, 27 are laid on the same line and thus accommodate the sliding guide rib 221. The third transmission gear 333 causes the link assembly 23 to be moved in the vertical direction by rotating in a state of being meshed with the rack gears 252, 262, 272.

Hereinafter, an operation of the calibration device will be described in more detail with reference to drawings.

FIG. 8 to FIG. 10 are views sequentially illustrating states of the link assembly of the calibration device driving for calibration operation.

With reference to FIG. 8, before starting the calibration operation, as illustrated, it is maintained a state where the link assembly 23 is accommodated in the inner portion of the housing 200. A portion of the link assembly 23 may project to the outside of the housing 200 according to the design forms of the housing 200.

with reference to FIG. 9, when a calibration operation command is input, power is applied to the drive motor 31 and thus the drive gear 32 is rotated in one direction. Accordingly, the link assembly 23 geared to the transmission gear 32 lowers by the transmission gear 33 meshed with the drive gear 32 being rotated. When the third link 27 lowers to a point escaping from the lower end portion of the display panel 12, the third link 27 rotates by 90 degrees in the upper direction about the hinge 28 by a restoring force of the torsion spring 29 mounted on the hinge 28 connecting the second link 26 and the third link 27 with each other.

With reference to FIG. 10, when the link assembly 23 is further lowered in a state of FIG. 9, the second link 26 escapes from the lower end portion of the display panel 12, and the second link 26 rotates by 90 degrees in the upper direction about the hinge 28 by a restoring force of a torsion spring 29 mounted on the hinge 28 connecting the first link 25 and the second link 26 with each other. The front surface of the third link 27 is in a state of facing the front surface of the display panel 12 by the third link 27 further rotating.

Specifically, when the second link 26 is rotated while escaping from the lower end portion of the display panel 12, the third link 27 is rotated with the second link 26 while maintaining at 90 degrees with the second link 26. As a result, the end portion of the third link 27, that is, the surface on which the photographing unit 35 is mounted approaching to the front surface of the display panel 12. When the second link 26 is in a horizontal state by rotating by 90 degrees, the third link 27 is maintained in a state of being spaced apart by a predetermined interval from the front surface of the display panel 12 by separating projection 272 projecting from the front surface of the third link 27 and thus the third link 27 is in a vertical state. A screen for calibration displayed on the display panel 12 through the photographing unit 34 is photographed in a state where the third link 27 faces the display panel 12.

Meanwhile, when the calibration operation is completed, the link assembly 23 is raised by the drive motor 31 being rotated in the reverse direction. The link assembly 23 is moved to the inner portion of the housing 200 by raising along the front surface, the lower side surface and the rear surface of the display panel 12. A raising process of the link assembly 23 may be performed in the reverse order of the lowering process thereof.

FIG. 11 is a perspective view illustrating a calibration device according to a second embodiment of the present invention, and FIG. 12 is a perspective view illustrating an inner structure of the calibration device.

With reference to FIG. 11 and FIG. 12, the calibration device 50 according to another embodiment of the present invention may includes a drive motor 51, a lead screw 52 which is connected to the rotating shaft of the drive motor 51, a link holder 53 which is mounted on an outer peripheral surface of the lead screw 52 and thus moves in the vertical direction along the lead screw 52, a link assembly 57 which is coupled to the link holder 53 and a housing 500 which surrounds to protect configurations except for the drive motor 51. The housing 500 is fixed to a rear surface of the display panel 12.

Specifically, the link assembly 57 includes a first link 54 which is directly connected to the link holder 53, a second link 55 which is rotatably connected to the lower end of the first link 54 by a first connector 542, a third link 56 which is rotatably coupled to the lower end portion of the second link 55 by a second connector 554, and a leaf spring 58 which is mounted on the inner portion of the first to the third links 54, 55, 56.

In addition, guide grooves 541, 551, 561 are formed on the both side surfaces of each of the first and the third links 54, 55, 56 and a guide rib (not illustrated) may be formed to extend on the inside surface of the housing 500. Accordingly, the link assembly 57 is raised and lowered in a state where the guide ribs are inserted into the guide grooves 541, 551, 561. The link assembly 57 maintains at a linear state without being bent in the inner portion of the housing 500 by a coupling structure between the guide rib and the guide groove. Each of the links 54, 55, 56 is bent by a restoring force of the leaf spring 60 at the moment completely escaping from the housing 500.

Meanwhile, a separating projection 562 and the photographing unit 61 are mounted on the front surface of the third link 56 in the lowermost side as with the previous embodiment. Even if the drive motor 51 may be mounted on the outer portion of the housing 500, a structure which is accommodated in the inner portion of the housing 500 and is not exposed to the outer portion thereof is also possible.

FIG. 13 is an enlarged perspective view illustrating a link holder.

With reference to FIG. 13, the link holder 53 is coupled in a form which surrounds the lead screw 52 and the projection 531 is formed on the inner peripheral surface of the link holder 53 which is in contact with the lead screw 52.

Specifically, a helical screw is formed on the outer peripheral surface of the lead screw 52. The projection 531 is designed in a form which is capable of being in contact with a valley portion of the screw. Here, the link holder 53 is lowered or raised along the lead screw 52 when the lead screw is rotated in a forward direction or in a reverse direction, since the link assembly 57 does not rotate by the housing 500, FIG. 14 is a cross-sectional view taken along a I-I line in the FIG. 12, and FIG. 15 is a longitudinal-sectional view taken along a II-II line in the FIG. 12.

With reference to FIG. 14 and FIG. 15, the second link 55 is rotatably connected to the first link 54 by a first connector 552.

Specifically, the first connector 542 projects by a predetermined length from the lower surface of the first link 54 and a housing groove 555 for accommodating the lower end portion of the first connector 542 is formed in a depressed shape on the upper surface of the second link 55. An axis projection 553 which is a rotation center of the second link 55 projects on the both side surfaces of the housing groove 555. An engaging groove or an engaging hole 543 to which the axis projection 553 is engaged may be formed on a both side surfaces of the lower end portion of the first connector 542.

The second connector 55 extends from the lower surface of the second link 55 and a housing groove 565 for accommodating the lower end portion of the second connector 554 is formed on the upper surface of the third link 56. An axis projection (not illustrated) which is a rotation center of the third link 56 may project on the both side surfaces of the housing groove 563. Even if not illustrated clearly, an engaging groove or an engaging hole to which the axis projection is engaged may be formed on a both side surfaces of the lower end portion of the second connector 554.

A spring accommodating groove 552 in which the leaf spring 58 is accommodated is formed to extend in the vertical direction on a rear surface of the second link 55. The leaf springs 58 may be independently coupled to a link connection portions, respectively. However, it is not limited to this and single leaf spring 58 may be provided. In other words, the upper end portion of one leaf spring 58 is inserted into the inner portion of the first link 54 and the lower end portion may be provided in a structure which is inserted into the inner portion of the third link 56.

FIG. 16 to FIG. 19 are views sequentially illustrating states of the link assembly of the calibration device driving for calibration operation.

With reference to FIG. 16, the link assembly 57 maintains at a linear state since the guide rib is inserted into the guide grooves 541, 551, 561 in a state of being accommodated in the inner portion of the housing 500.

In this state, when the drive motor 51 rotates in one direction, the lead screw 52 rotates and when the lead screw 52 rotates, the link holder 53 is lowered along the lead screw 52. As a result, the third link 56 escapes from the housing 500 while lowering in a vertical state.

With reference to FIG. 17, when the third link 56 completely escapes from the housing 500, the third link 56 rotates about the axis projection of the second link 55 by an elastic force of the leaf spring 58. The third link 56 becomes a horizontal state at the lower surface of the display panel 12.

With reference to FIG. 18, when the second link 55 starts to escape from the housing 500 by further lowering, the third link 56 further lowers while maintaining at a horizontal state which forms 90 degrees with the second link 55. The third link 56 is away from the lower surface of the display panel 12 by lowering while maintaining at the horizontal state until the second link 55 completely escapes from the housing 500.

With reference to FIG. 19, when the second link 55 completely escapes from the housing 500, the second link 55 rotates about the axis projection 553 to be a horizontal state at the lower surface of the display panel 12 by an elastic force of the leaf spring 58.

At the same time, the third link 56 becomes a vertical state by the third link 56 rotating with the second link 55. In other words, the photographing unit 59 becomes a state facing the front surface of the display panel 12. The photographing unit 61 becomes a separated state of being spaced apart from the front surface of the display panel 12 by the separating projection 562 being in contact with the front surface of the display panel 12, as already described above.

FIG. 20 is a conceptual side view illustrating a calibration device according to a third embodiment of the present invention.

With reference to FIG. 20, the calibration device 70 according to the present invention may include a housing 72 which is fixed to the upper end portion region of the rear surface of the display panel 12, a link assembly 74 which projects from the housing 71 to the upper side, and an photographing unit 71 which is mounted on the end portion of the link assembly 84.

Specifically, the link assembly 84 may be a bendable link which is capable of extending and being gently bent in a curved shape. In other words, the link assembly 74 may be a member that is bent in a setting curvature by a drive means, passes by the upper end portion of the display panel 12 and is capable of moving to the front surface portion of the display panel 12. For example, a bendable flexible cable is possible and this flexible cable is already applied to an endoscopic photographing apparatus.

FIG. 21 is a conceptual side view illustrating a calibration device according to a fourth embodiment of the present invention.

With reference to FIG. 21, the calibration device 80 according to the present invention may include a housing 82 which is fixed to the upper end portion region of the rear surface of the display panel 12, a link assembly 84 which has one end rotatably connected by a hinge axis 83 in the inner portion of the housing 72 and is bent in a U-shape, and an photographing unit 81 which is mounted on another end of the link assembly 84.

Specifically, when the hinge shaft 83 is rotated by the drive motor (not illustrated) while the link assembly 84 is accommodated in the inner portion of the housing 82 in a U-shape in a state of being connected to the hinge shaft 83, the link assembly rotates toward the front side of the display panel 12 in any one direction (in the counterclockwise direction in drawings). Therefore, the link assembly 84 is rotated in a reverse U-shape and as a result, the photographing unit 81 is located in the front side of the display panel 12.

FIG. 22 is a front view illustrating a display apparatus having a calibration device according to a first embodiment of the present invention and the calibration device.

With reference to FIG. 22, a display apparatus 10 according to an embodiment of the present invention includes a display panel 12 on which an image is output, a bezel 13 which surrounds the edge of the display panel 12 and thus protects, and a stand 11 which supports the display panel 12.

FIG. 23 is a partial front view illustrating a display apparatus in a state where the calibration device according to the embodiment of the present invention is operated, and FIG. 24 is a partial rear view illustrating a display apparatus in a state where the calibration device is operated.

With reference to FIG. 23 and FIG. 24, the calibration device 40 according to the embodiment of the present invention is mounted on the edge of the rear surface of the display panel 12 and is located in the rear side of the bezel 13.

Specifically, the calibration device 40 is not recognized by eyes of the user by being concealed by the bezel 13 when the calibration device 40 is not operated. When the calibration mode is started, the calibration device 40 escapes from an inside rim of the bezel 13 by sliding in the horizontal direction and thus is exposed to the outside. The calibration device 40 performs the calibration operation by positioning one side of the front surface of the display panel 12.

FIG. 25 is a front perspective view illustrating the calibration device according to the embodiment of the present invention, and FIG. 26 is an exploded perspective view illustrating the calibration device.

With reference to FIG. 25 and FIG. 26, the calibration device 40 according to the embodiment of the present invention includes a housing 41 which is fixed to the rear surface of the bezel 13, a transfer module 44 which is provided in the inside of the housing 41, a moving member 43 which slides in the lateral direction by operation of the transfer module 44, a slider 42 which slides with the moving member 43 by being seated on the upper surface of the moving member 43 and an photographing unit 421 which is mounted on the front surface of the slider 42.

Here, a surface on which the photographing unit 421 is mounted is defined as a front surface of the calibration device 40 and the opposite surface to the surface on which the photographing unit 421 is mounted is defined as a rear surface of the calibration device 40. The calibration device 40 is mounted on the rear surface of the bezel 13 so that the photographing unit 421 faces the front surface of the display panel 12. In other words, when the slider 42 slides to escape from the rear surface of the bezel 13 for the calibration operation, the rear surface of the slider 42 is recognized by eyes of the user by the rear surface of the slider 42 facing the front side of the display apparatus 10.

Hereinafter, each of components constituting the calibration device 40 will be described in more detail with reference to drawings.

FIG. 27 is a perspective view illustrating a housing constituting a calibration device according to the embodiment of the present invention.

With reference to FIG. 27, The housing 41 constituting the calibration device 40 according to the embodiment of the present invention includes a bottom portion 411, a front surface wall 412 which vertically extends from a front side edge of the bottom portion 411, a rear surface wall 413 which vertically extends from a rear side edge of the bottom portion 411, and the motor housing 414 which is formed on a side edge of the bottom portion 411. A side wall vertically extends from the side edge of the bottom portion 411 corresponding to an opposite side of the motor housing 414.

In addition to, a moving member guide hole 415 may be formed on the front surface wall 412 and on the rear surface wall 413. Specifically, the moving member guide hole 415 includes a vertical hole 416 which vertically extends and a horizontal hole 417 which horizontally extends from a lower end portion of the vertical hole 416, and thus generally has a L-shape. The slider 42 moves from the rear side of the bezel 13 to the front surface of the display panel 12 by vertically lowering and horizontally moving by the moving member guide hole 415.

FIG. 28 is a perspective view illustrating a slider constituting a calibration device according to the embodiment of the present invention.

With reference to FIG. 28, the slider 42 constituting the calibration device 40 according to the embodiment of the present invention may include a seating portion 422 which is seated on the upper surface of the moving member 43, a supporting portion 423 which vertically extends from the front end portion of the seating portion 422 and a bending portion 427 which has a jaw shape and vertically extends from the rear end portion of the seating portion 422.

Specifically, a pair of guide holes 426 is formed to extend from positions facing each other by a predetermined length in the lateral direction on the seating portion 422. A pair of guide projections 428 are formed at the same height on an outside surface of the supporting portion 423 and an outside surface of the bending portion 427, respectively. The pair of guide projections 428 are inserted into the moving member guide hole 415 formed on the front surface wall 412 and the rear surface wall 413 of the housing 421, respectively. When the slide 42 moves, the pair of guide projections 428 vertically and horizontally moves along the moving member guide hole 415. The engaging groove 429 is formed to be depressed on the front end portion and the rear end portion of the bottom surface of the seating portion 422 and the engaging groove 429 is a portion on which a transfer projection 436 (see FIG. 29) to be described below is seated.

In addition, a mounting plate 424 is mounted on the inside surface (or a rear surface) of the supporting portion 423 and the photographing unit 421 is mounted on any one point of the upper side of the mounting plate 424. The photographing unit 421 is the same as the photographing unit described in the previous embodiments and may define calibration sensor. The photographing unit 421 photographs a screen for test displayed on the display panel 12 and then sends the photographed screen to the control unit (not illustrated) which performs the calibration operation.

In addition, the bezel connection portion 425 is formed on the supporting portion 423. Specifically, the bezel connection portion 425 is a portion which forms a portion of the inside edge of the bezel 13 and defines a portion of the inside edge of the bezel 13 in a state where the calibration device 40 positions in the rear side of the bezel 13. More specifically, among four edge portions of the bezel 13, an inside rim portion corresponding to the inner edge of the bezel 13 on which the calibration device 40 is mounted is cut for smoothly moving of the slide 42 constituting the calibration device 40. In other words, the slider 42 is capable of sliding from the rear side of the bezel 13 to the center direction of the lower end portion of the display panel 12 at the rear side of the bezel 13 along the cut portion of the bezel 13. When the slider 42 moves to the rear side of the bezel 13, the cut inside rim portion of the bezel 13 subsequently connected with the inside rim portion which does not cut by the bezel connection portion 425 and thus is recognized as a bezel having a completely tetragonal strip shape by the eyes of a user.

The bezel connection portion 425 includes a vertical connection portion 425a which connects a vertical rim portion among the cut inside rim portions of the bezel 13 and a horizontal connection portion 425b which connects a horizontal rim portion. The vertical connection portion 425a may be a portion of the side surface of the supporting portion 423 and the horizontal connection portion 425b may horizontally extend from the side surface of the supporting portion 423. The vertical connection portion 425a and the horizontal connection portion 425b may have the same width as the width of the inside rim portion of the bezel 13.

FIG. 29 is a perspective view illustrating a state where a moving member constituting the calibration device according to the fifth embodiment of the present invention is mounted on the transfer module, and FIG. 30 is a partial perspective view viewing from a lower surface of the moving member.

With reference to FIG. 29 and FIG. 30, the moving member according to the embodiment of the present invention includes a main body portion 431, a pair of a guide bosses 432 which projects from an upper surface of the main body portion 431, respectively, a pair of transfer projections 436 which projects from the front end portion side and the rear end portion side of the upper surface of the main body portion 431, a supporting projection 433 which projects from a side end portion side of the upper surface of the main body portion 431, and a lead screw holder 439 which is formed on a lower surface of the main body portion 431.

Specifically, the guide boss 432 transfers the slider 42 by being inserted into the pair of guide hole 426 formed on the seating portion 422 of the slider 42, respectively.

In addition, each of the pair of transfer projections 436 includes an inclined surface 437 which inclines in the upper direction and a planar surface 438 which extends flat from an end portion of the inclined surface. The transfer projection 436 is inserted into the engaging groove 429 which is formed on the lower surface of the slider 42.

Further, the supporting projection 433 projects in the upper direction from the side end portion of the main body portion 431 and may be formed at the point bisecting a distance between the pair of transfer projections 426. The supporting projection 433 includes an inclined surface 434 and a planner surface 435 like the transfer projection 436.

In addition, the lead screw holder 439 may be formed in a tunnel shape on the lower surface of the main body portion 431 and the projecting portion 439a is formed to project on the inner peripheral surface of the lead screw holder 439. The read screw 442 to be described below is inserted into the inside of the read screw holder 439.

Meanwhile, the transfer module 44 may include a base plate 440 which is disposed on the bottom surface of the housing 41, a drive motor 441 which is disposed on the side surface edge of the base plate 440, a lead screw 442 which is connected to the rotating shaft of the drive motor 441, and a pair of transfer guide bars 443 which are connected to the main body portion 431 of the moving member 43. Only one transfer guide bar 433 may be provided or at least three transfer guide bars 433 may be provided.

Specifically, the lead screw 442 is penetrated from and is inserted into the screw holder 439, and the projecting portion 439a is engaged to a spiral screw groove formed on an outer peripheral surface of the lead screw 442. The moving member 43 moves to the direction approaching to the drive motor 441 or the direction away from the drive motor 441 along the lead screw 442 by the projecting portion 439a moving along the spiral screw groove as the lead screw 442 rotates. The drive motor 441 may be accommodated in the motor housing 414 provided in the housing 41.

In addition, the transfer guide bar 443 may includes a first transfer guide bar which is penetrated from and is inserted into the main body portion 431 of the moving member 43 and a second transfer guide bar which is provided in a shape which is in close contact with the lower surface of the main body portion 431. The pair of transfer guide bar 443 may be disposed on the sides of the front end portion and the rear end portion of the main body portion 431, respectively.

Specifically, the first transfer guide bar may be connected to the main body portion 431 in a shape which penetrates through from the left side end to the right side end of the main body portion 431 at the point approaching to the front end portion of the main body portion 431. A stepping portion is formed on the lower surface of the rear end portion of the main body portion 431 and the stepping portion may be disposed on the second transfer guide bar. However, this is not limited to the presented embodiment, and all the first and the second transfer guide bars penetrate through the main body portion 431 in the side direction of the main body portion 431 or the stepping portion is formed on the lower surface of the front end portion and the rear end portion of the main body portion 431 respectively, and the stepping portion may be seated on the first and the second transfer guide bars.

An operating mechanism of the calibration device 40 described above will be described in detail with reference to the drawings.

FIG. 31 is a rear view illustrating the calibration device according to the embodiment of the present invention in a default state, and FIG. 32 is a rear perspective view of the bezel illustrating a position of the calibration device in a default state.

With reference to FIG. 31 and FIG. 32, the calibration device 40 is maintained in a completely concealed state at the rear side of the bezel 13 in a default state where the calibration device 40 is not operated. In this state, the bezel connection portion 425 provided to the slider 42 is disposed on the cut inside rim portion of the bezel 13 and thus forms the same plane as the inside rim of the bezel 13.

Specifically, the bezel 13 has a tetragonal strip shape and includes a front surface portion 131 which defines a front surface edge of the display apparatus 10, an inside horizontal portion 132 and an inside vertical portion 135 which are bent from the inside edge of the front surface 131 to the rear side, and an outer horizontal portion 133 and an outer vertical portion 135 which are bent from the outside edge of the front surface portion 131 to the rear side. Accordingly, an inside rim of the bezel 13 defines by a pair of opposed inside horizontal portions 132 and a pair of opposed inside vertical portions 135 being connected to each other. An outside rim of the bezel 13 defines by a pair of opposed outside horizontal portions 133 and a pair of opposed outside vertical portion 134 being connected to each other. A point which meets the inside horizontal portion 132 and inside vertical portion 135 adjacent to each other is defined as an inside corner of the bezel 13 and a point which meets the outside horizontal portion 133 and the outside vertical portion 134 adjacent to each other is defined as an outer corner of the bezel 13.

When the slider 42 is in the default state, the horizontal connection portion 425b of the slider 42 forms the same plane as the inside horizontal portion 132 of the bezel 13 and the vertical connection portion 425a forms the same plane as the inside vertical portion 135 of the bezel 13. Accordingly, there is an effect of the cut inside rim portion of the bezel 13 being not recognized by the user.

At the default state, a state where the bottom portion of the slider 42 is placed on the transfer projection 436 and the supporting projection 433 which projects on the upper surface of the moving member 43 is maintained. In other words, a state where the lower surface of the seating portion 422 constituting the slider 42 is seated on the planner surface 438 of the transfer projection 436 and the planner surface 435 of the supporting projection 433 is maintained. The guide projection 428 which projects from the front surface and the rear surface of the slider 42 is in a state of being inserted into the moving member guide hole 415 formed on the front surface wall 412 and the rear surface wall 413 of the housing 41, specifically, and is maintained in a state which is in close contact with the upper end portion of the vertical hole 416.

FIG. 33 is a side view illustrating the calibration device according to the embodiment of the present invention viewing an operating start state, and FIG. 34 is a rear perspective view of the bezel illustrating a position of the calibration device in the operating start state.

With reference to FIG. 33 and FIG. 34, when a calibration mode is started and thus power is applied to the drive motor 441 of the transfer module 44, the lead screw 442 rotates in a first direction. Then, the lead screw holder 439 which is meshed with the lead screw 442 moves in a direction approaching to the drive motor 441 along the lead screw 442. The main body portion 431 of the moving member 43 is moved the lead screw holder 439 moves and the transfer projection 436 which projects from the upper surface of the main body portion 431 moves in a direction approaching to the drive motor 441.

The transfer projection 436 is inserted into the engaging groove 429 which is formed on the lower surface of the slider 42, and as a result, the slider 42 is lowered by a distance corresponding to a height of the transfer projection 436. The upper surface of the supporting portion 423 of the slider 42 is spaced apart from the inside vertical portion 135 of the bezel 13 to the lower side, as the slider 42 lowers. The horizontal connection portion 425b of the slider 42 is lowered than the inside horizontal portion 132 of the bezel 13 and thus the upper surface of the horizontal connection portion 425b positions on the lower surface of the inside horizontal portion 132.

In addition, the guide projection 428 which is projected on the front surface and the rear surface of the slider 42 lowers, escapes from the vertical hole 416 of the moving member guide hole 415 and thus is disposed on one side end portion of the horizontal hole 417. According to this, the slider 42 becomes a state of capable of moving in a direction approaching to the drive motor 441.

FIG. 35 is a rear view illustrating the calibration device according to the embodiment of the present invention in a state where the slider is moved to the maximum, and FIG. 36 is a rear perspective view of the bezel illustrating a position of the calibration device in a moving state to the maximum.

With reference to FIG. 35 and FIG. 36, the moving motor 43 moves in a direction approaching to the drive motor 441 along the moving guide bar 443, as the drive motor 441 further rotates in the first direction in a state of FIG. 34.

Specifically, in a state where the transfer projection 436 engages to the engaging groove 429, the moving member 43 and the slider 42 are moves as one body. The moving member 43 moves along the moving guide bar 443 until the guide projection 428 reaches the other side end portion of the horizontal hole 317.

When the guide projection 428 reaches the other side end of the horizontal hole 317, the vertical connection portion 425a of the slider 42 is in contact with the inside horizontal portion 132 of the bezel 13 or becomes an immediate before state in contact with the inside horizontal portion 132 of the bezel 13. In this state, the calibration screen is displayed on the region of the display panel 12 corresponding to the point on which the photographing unit 421 is positioned. The calibration screen is photographed by the photographing unit 421 and the photographed screen sends to the control unit and the calibration operation is performed using image information sent from the photographing unit 421 in the control unit.

FIG. 37 is a rear view illustrating the calibration device according to the embodiment of the present invention viewing a moving start state to an original position.

With reference to FIG. 37, when the calibration operation is completed, the drive motor 441 rotates in a second direction opposite to the first direction and thus the slide 42 moves in an original position.

Specifically, when the slide 42 starts to move in a direction away from the drive motor 441, an inclined surface of the transfer projection 436 pushes the slider 42 in the upper direction while pressurizing the inclined surface defining the engaging groove 429. According to this, the planner surface 438 of the transfer projection 436 is separated from the upper surface defining the engaging groove 429 while the slider 42 raises.

Here, the slider 42 pushes in the upper direction as the transfer projection 436 moves in a direction away from the drive motor 441. However, the upper surface of the horizontal connection portion 425*b* engages to the lower surface of the inside horizontal portion 132 of the bezel 13 and thus cannot raise any more. Accordingly, the moving member 43 and the slider 42 moves as one body while maintaining a state where the transfer projection 436 engages to the engaging groove 429 until the horizontal connection portion 425*b* escapes from the inside horizontal portion 132 of the bezel 13.

FIG. 38 is a rear view illustrating the calibration device according to the embodiment of the present invention in a state where a horizontal connection portion of a slider is positioned escaping from an inner horizontal portion of the bezel.

With reference to FIG. 38, when the horizontal connection portion 425*b* of the slider 42 escapes from the inside horizontal portion 132 of the bezel 13, the transfer projection 436 of the moving member 43 moves while maintaining the state of the FIG. 16, or maintaining a state where the slider 42 slight further pushing in the upper direction. However, the transfer projection 436 does not completely escape from the engaging groove 429 by the weight of the slider 42. Accordingly, the slider 43 and the moving member 42 move as one body while maintaining a state where the transfer projection 436 engages to the engaging groove 429, even if the horizontal connection portion 425*b* escapes from the inside horizontal portion 132 of the bezel 13.

FIG. 39 is a rear view illustrating the calibration device according to the embodiment of the present invention viewing a state of returning to the original position.

With reference to FIG. 39, when the slider 42 is returned to the original position, the guide projection 428 positions on one end of the horizontal hole 417. In a state where the guide projection 428 positions on one end of the horizontal hole 417, the end portion of the horizontal connection portion 425*b* positions on the vertical line passing by the end portion of the inside horizontal portion 132 in the position which is lower than the inside horizontal portion 132 of the bezel 13. In this state, the slider 42 does not move any more in the horizontal direction and the vertical connection portion 425*a* and the inside vertical portion 135 form the same plane with each other.

Specifically, in a state where the guide projection 428 positions on one end of the horizontal hole 417, when the transfer projection 436 is more moved by the drive motor 441 further rotating in the second direction, the transfer projection 436 escapes from the engaging groove 429. The transfer projection 436 pushes the slider 42 in the upper direction while moving along the inclined surface of the engaging groove 429. When the planner surface 438 of the transfer projection 436 and the planner surface 435 of the supporting projection 433 position on the lower surface of the seating portion 422 of the slider 42, the guide projection 428 positions on the upper end of the vertical hole 416. In this state, the upper surface of the horizontal connection portion 425*b* forms the same plane as the inside horizontal portion 132, and the upper end of the vertical connection portion 425*a* is in contact with the lower end of the inside vertical portion 135 and thus the inside corner portion of the bezel 13 forms a smooth L-shape. The photographing unit 421 of the calibration device 40 is completely concealed in the rear side of the bezel 13.

Meanwhile, the calibration device according to the embodiments described above can commonly operate in the following cases.

First, the calibration process can be automatically performed before a specific content is reproduced on the display panel 12 or when an event is generated.

Specifically, the calibration process can be automatically performed before ultra-high resolution screen, content having many motions, movies, nature documentaries, or the like. is reproduced on the display panel 12.

The calibration process can be automatically performed when entering the gallery site or folder having high resolution pictures, when entering a specific web site, when executing application required for high resolution, and when referring to the broadcast additional information.

In addition, in a case where the display apparatus does not turn on for a long time, in a case where an average image quality drops below a certain value, or in a case where temperature change is generated, the calibration process is automatically performed or Notification pop-up window which recommends that the calibration process performs to a user can be displayed.

In addition, the calibration process can be automatically started when a period requiring a new mode is started during the setting time, such as a scene changing during the content reproduction.

In addition, when it is determined that the calibration process is required by corresponding to any one of the above cases, the calibration process is automatically performed at the same time as the display apparatus turns off or is automatically performed at the same time as the display apparatus turns on and then the image can be output.

In addition, the reproduction of the corresponding content can be paused until the termination of the calibration process, when the calibration process starts during the content reproduction.

The invention claimed is:

1. An display apparatus, comprising:
a display panel on which an image is output; and
a calibration device which is mounted on a rear surface of the display panel,
wherein the calibration device includes
a housing,
a drive motor which is disposed on an inside portion or an outside portion of the housing,
a link assembly which is accommodated in the inside portion of the housing, which is capable of being withdrawn to the outside of the housing by power provided form the drive motor and which is provided to be capable of being bent or being rotated, and
an photographing unit which is mounted on an end of the link assembly and photographs the image displayed on the display panel,
wherein the link assembly is multi-node links in which a plurality of links are connected in series and which are rotatably interconnected, and
wherein the lowermost end portion link constituting the multi-node links is capable of rotating with angle in which the lowermost end portion link is located on the front surface of the display panel,
wherein the calibration device further includes a torsion spring which is provided on a rotating shaft of the multi-node links and rotates the links,
wherein the calibration device further includes a drive mechanism which transfers a rotational force provided from the drive motor to the link assembly,
wherein the drive mechanism includes
a drive gear which is connected to the rotational shaft of the drive motor, and at least one transmission gear which is geared to the drive gear, and wherein a rack gear which is engaged with the transmission gear is formed on the side surface of the link assembly.

2. The display apparatus according to claim 1, wherein the calibration device further includes a link movement restriction mechanism for setting a movement limit of the link assembly.

3. The display apparatus according to claim 2, wherein the link movement restriction mechanism includes a lever switch which is mounted on a side of an inside portion of the housing, and an upper engaging jaw and a lower engaging jaw which are formed on the side surface of the link assembly, and wherein the lever switch is engaged to the upper engaging jaw or the lower engaging jaw, a movement stopping signal is generated and thus an operation of the drive motor is stopped.

4. The display apparatus according to claim 2, wherein the link movement restriction mechanism includes a magnet which is mounted on an upper side and a lower side of the link assembly, and a hall sensor which is mounted on the inside portion of the housing and detects a magnetic field generating from the magnet, and wherein when a detect signal is generated from the hall sensor, the operation of the drive motor is stopped.

5. The display apparatus according to claim 1, wherein the calibration device further includes at least one guide ribs which are projected from the inside surface of the housing and extend in the movement direction of the link assembly; and at least one guide grooves which are formed to be depressed on an outer peripheral surface of the link assembly in a position corresponding to the at least one guide ribs.

6. The display apparatus according to claim 2, wherein the calibration device further includes a leaf spring which is provided to a side of the multi-node links and rotates the links.

7. The display apparatus according to claim 6, wherein the calibration device further includes a drive mechanism which transfers a rotational force provided from the drive motor to the link assembly and thus causes the link assembly to be moved in the vertical direction, and wherein the drive mechanism further includes a lead screw which is connected to the rotational shaft of the drive motor, and a link holder which is mounted on the outer peripheral surface of the lead screw and moves in the vertical direction along the lead screw when the lead screw rotates, and wherein an upper end portion of the link assembly is mounted on the link holder.

8. The display apparatus according to claim 1, wherein the link assembly is a bendable link which is capable of extending and being gently bent in a curved shape.

9. The display apparatus according to claim 1, wherein the calibration device further includes a hinge shaft which is provided in an inside portion of the housing, to which an end of the link assembly is connected and which rotates by the drive motor, and wherein the link assembly is a link which is bent in an U-shape.

10. The display apparatus according to claim 1, wherein the calibration device performs a calibration process by automatically operating before reproduction of a particular content through the display panel or when a particular event generates.

11. The display apparatus according to claim 10, wherein the particular content includes at least one of an ultra high definition video content, a content having many motions, films, and nature documentaries.

12. The display apparatus according to claim 10, wherein the particular event includes at least any one of gallery entry having high resolution photograph, specific website entry, application execution requiring high resolution, a broadcast additional information reference situation.

13. The display apparatus according to claim 10, wherein the particular event includes at least one of a case where the average image quality falls into a value which is equal to or less than a set value by the display apparatus not turning on for a long period of time, a case where temperature change is generated, and a case where the scene changes during the content reproduction.

14. The display apparatus according to claim 10, wherein the calibration device performs a calibration process by operating at the same time as turning off the display panel.

15. The display apparatus according to claim 10, wherein the calibration device performs a calibration process by operating at the same time as turning on the display panel and after the calibration process is terminated the content is displayed on the display panel.

16. The display apparatus according to claim 10, wherein the reproduction of the content is paused until the terminated of the calibration process, in a case where the calibration process is performed by the calibration being operated during the content reproduction.

* * * * *